(12) United States Patent
Zeiler et al.

(10) Patent No.: US 7,712,182 B2
(45) Date of Patent: May 11, 2010

(54) AIR FLOW-PRODUCING DEVICE, SUCH AS A VACUUM CLEANER OR A BLOWER

(75) Inventors: Jeffrey M. Zeiler, Delafield, WI (US); David A. Selby, Oconomowoc, WI (US); Jonathan A. Zick, Waukesha, WI (US); Scott D. Bublitz, Hartland, WI (US); Melissa A. Ottens-Rendon, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1691 days.

(21) Appl. No.: 10/898,437

(22) Filed: Jul. 23, 2004

(65) Prior Publication Data

US 2005/0055795 A1 Mar. 17, 2005

Related U.S. Application Data

(60) Provisional application No. 60/578,029, filed on Jun. 8, 2004, provisional application No. 60/490,190, filed on Jul. 25, 2003.

(51) Int. Cl.
*A47L 9/10* (2006.01)
(52) U.S. Cl. .......................................... 15/353; 15/319
(58) Field of Classification Search .................. 15/353, 15/327.5, 328, 338, 323, 319
See application file for complete search history.

(56) References Cited

U.S. PATENT DOCUMENTS

| | | | |
|---|---|---|---|
| 3,267,510 A | 8/1966 | Cote | |
| 3,855,665 A | 12/1974 | Schwartz | |
| 3,952,239 A | 4/1976 | Owings et al. | |
| RE28,920 E | 8/1976 | Schwartz | |
| 4,011,624 A | 3/1977 | Proett | |
| 4,021,879 A | 5/1977 | Brigham | |
| 4,225,814 A | 9/1980 | Gantz et al. | |
| 4,306,329 A | 12/1981 | Yokoi | |
| 4,369,543 A | 1/1983 | Chen et al. | |
| 4,394,606 A | 7/1983 | Woerwag | |

(Continued)

FOREIGN PATENT DOCUMENTS

CH 575 748 5/1976

(Continued)

OTHER PUBLICATIONS

Black and Decker VersaPak Tool Set, 1995 Black and Decker, Inc. Catalog.

(Continued)

*Primary Examiner*—Lee D Wilson
(74) *Attorney, Agent, or Firm*—Michael Best & Friedrich LLP

(57) ABSTRACT

Electrical components and vacuums. In some aspects, the invention provides an electrical component including a housing defining a passageway, a motor supported by the housing, the motor being selectively electrically connectable with a power source, a fan connected to the motor and operable to generate an airflow through the passageway, an electrical circuit supported by the housing, the electrical circuit being selectively electrically connectable with the power source, and a power-tool battery electrically connectable with the electrical circuit such that power is selectively transferred between the battery and the electrical circuit, the battery being connectable to the housing. In some aspects, the invention provides a vacuum.

10 Claims, 38 Drawing Sheets

U.S. PATENT DOCUMENTS

| | | | |
|---|---|---|---|
| 4,399,585 A | 8/1983 | Kullik et al. |
| 4,419,783 A | 12/1983 | Steffen |
| 4,513,469 A | 4/1985 | Godfrey et al. |
| 4,513,470 A | 4/1985 | Toya |
| 4,517,502 A | 5/1985 | Aschoff et al. |
| 4,541,142 A | 9/1985 | Pudwill |
| 4,542,557 A | 9/1985 | Levine |
| 4,573,234 A | 3/1986 | Kochte et al. |
| 4,577,365 A | 3/1986 | Yuen |
| 4,611,365 A | 9/1986 | Komatsu et al. |
| 4,654,924 A | 4/1987 | Getz et al. |
| 4,670,701 A | 6/1987 | Sako et al. |
| 4,682,384 A | 7/1987 | Prahl et al. |
| 4,748,712 A | 6/1988 | DiGiovanni |
| 4,835,409 A | 5/1989 | Bhagwat et al. |
| D301,647 S | 6/1989 | Burns et al. |
| 4,845,793 A | 7/1989 | Meyer |
| 4,852,208 A | 8/1989 | Morishita et al. |
| 4,863,593 A | 9/1989 | Quick |
| RE33,074 E | 10/1989 | Levine |
| 4,899,418 A | 2/1990 | Steiner et al. |
| 4,920,606 A | 5/1990 | Gerke, Jr. et al. |
| 4,920,608 A | 5/1990 | Hult et al. |
| 4,924,548 A | 5/1990 | Touya et al. |
| 4,934,020 A | 6/1990 | Jackson |
| 4,945,603 A | 8/1990 | Herron, Jr. |
| 4,947,514 A | 8/1990 | Gerke, Jr. et al. |
| 4,956,892 A | 9/1990 | Fawkes |
| 4,961,246 A | 10/1990 | Hauge et al. |
| 4,962,559 A | 10/1990 | Schuman |
| 4,992,718 A | 2/1991 | Kumaki |
| 4,993,106 A | 2/1991 | Hult et al. |
| 5,005,252 A | 4/1991 | Steiner et al. |
| 5,014,386 A | 5/1991 | Worwag |
| 5,014,388 A | 5/1991 | Schiazza et al. |
| 5,018,238 A | 5/1991 | Nelle |
| 5,020,186 A | 6/1991 | Lessig, III et al. |
| 5,023,973 A | 6/1991 | Tsuchida et al. |
| 5,025,529 A | 6/1991 | Hult et al. |
| 5,035,024 A | 7/1991 | Steiner et al. |
| 5,072,484 A | 12/1991 | Edlund |
| 5,084,934 A | 2/1992 | Lessig, III et al. |
| 5,089,037 A | 2/1992 | Marsolais |
| 5,095,259 A | 3/1992 | Bailey et al. |
| 5,115,538 A | 5/1992 | Cochran et al. |
| 5,134,752 A | 8/1992 | Shipman |
| 5,208,525 A | 5/1993 | Lopic et al. |
| 5,220,269 A | 6/1993 | Chen et al. |
| 5,274,878 A | 1/1994 | Radabaugh et al. |
| 5,337,443 A | 8/1994 | Steinberg et al. |
| 5,343,590 A | 9/1994 | Radabaugh |
| 5,353,468 A | 10/1994 | Yap et al. |
| 5,355,548 A | 10/1994 | Dekker |
| 5,449,988 A | 9/1995 | Gurstein et al. |
| 5,455,984 A | 10/1995 | Blase |
| 5,495,636 A | 3/1996 | Dekker et al. |
| 5,504,412 A | 4/1996 | Chan et al. |
| 5,560,076 A * | 10/1996 | Leung ......................... 15/339 |
| 5,588,177 A | 12/1996 | Eriksen |
| 5,664,285 A | 9/1997 | Melito et al. |
| 5,671,499 A | 9/1997 | Melito et al. |
| 5,673,457 A | 10/1997 | Webster et al. |
| 5,699,586 A | 12/1997 | Melito et al. |
| 5,701,632 A | 12/1997 | Webster et al. |
| 5,709,007 A | 1/1998 | Chiang |
| 5,718,014 A | 2/1998 | deBlois et al. |
| 5,727,283 A | 3/1998 | Webster |
| 5,765,258 A | 6/1998 | Melito et al. |
| 5,787,546 A | 8/1998 | Bass et al. |
| 5,794,303 A | 8/1998 | Sanfilippo et al. |
| 5,829,090 A | 11/1998 | Melito et al. |
| 5,839,156 A | 11/1998 | Park et al. |
| 5,869,947 A | 2/1999 | Zahuranec et al. |
| 5,926,909 A | 7/1999 | McGee |
| 5,940,930 A | 8/1999 | Oh et al. |
| 5,954,863 A | 9/1999 | Loveless et al. |
| 6,044,519 A * | 4/2000 | Hendrix ....................... 15/319 |
| 6,049,944 A | 4/2000 | Lopez |
| 6,066,211 A | 5/2000 | Sandell |
| 6,075,341 A | 6/2000 | White et al. |
| 6,099,661 A | 8/2000 | Conrad |
| 6,104,162 A | 8/2000 | Sainsbury |
| 6,105,202 A | 8/2000 | Grasso et al. |
| 6,181,032 B1 | 1/2001 | Marshall et al. |
| RE37,081 E | 3/2001 | Eriksen |
| 6,198,195 B1 | 3/2001 | Embree et al. |
| 6,246,133 B1 | 6/2001 | Embree et al. |
| 6,255,792 B1 | 7/2001 | Grasso et al. |
| 6,260,235 B1 | 7/2001 | Leung |
| 6,295,682 B1 | 10/2001 | Klucznik |
| 6,295,692 B1 | 10/2001 | Shideler |
| 6,305,048 B1 | 10/2001 | Salisian |
| 6,311,366 B1 | 11/2001 | Sepke et al. |
| 6,357,070 B1 | 3/2002 | Venard et al. |
| 6,363,574 B2 | 4/2002 | Worden et al. |
| 6,376,942 B1 | 4/2002 | Burger et al. |
| 6,383,266 B1 | 5/2002 | Conrad et al. |
| 6,393,656 B1 | 5/2002 | Paterson et al. |
| 6,442,792 B1 | 9/2002 | Sudou et al. |
| 6,448,732 B1 | 9/2002 | Block |
| 6,457,205 B1 | 10/2002 | Conrad |
| 6,457,206 B1 | 10/2002 | Judson |
| 6,493,903 B1 | 12/2002 | Super |
| 6,499,182 B2 | 12/2002 | Berfield et al. |
| 6,608,466 B2 | 8/2003 | Riley |
| 6,615,446 B2 * | 9/2003 | Noreen et al. ................. 15/410 |
| D480,845 S | 10/2003 | Ki |
| 6,647,586 B2 | 11/2003 | Rogers et al. |
| 6,647,587 B1 | 11/2003 | Ohara et al. |
| 6,664,748 B2 | 12/2003 | Kushida et al. |
| 6,712,868 B2 | 3/2004 | Murphy et al. |
| 6,732,403 B2 | 5/2004 | Moore et al. |
| 6,735,813 B2 | 5/2004 | Oohama |
| 6,763,548 B1 | 7/2004 | Birle et al. |
| D496,764 S | 9/2004 | Lopano |
| 6,785,932 B2 | 9/2004 | Bone |
| 6,818,036 B1 | 11/2004 | Seaman |
| 6,839,934 B2 | 1/2005 | Houghton et al. |
| 7,014,949 B2 | 3/2006 | Kanai et al. |
| 7,048,804 B2 | 5/2006 | Kisela et al. |
| 7,137,169 B2 | 11/2006 | Murphy et al. |
| 2001/0023517 A1 | 9/2001 | Onishi et al. |
| 2001/0042442 A1 | 11/2001 | Alberts, III et al. |
| 2001/0054212 A1 | 12/2001 | Walker |
| 2002/0000020 A1 | 1/2002 | Walker |
| 2002/0011054 A1 | 1/2002 | Yung |
| 2002/0038489 A1 | 4/2002 | Paterson et al. |
| 2002/0039015 A1 | 4/2002 | Riley |
| 2002/0042969 A1 | 4/2002 | Nagai et al. |
| 2002/0066153 A1 | 6/2002 | Sclafani et al. |
| 2002/0069476 A1 | 6/2002 | Yung |
| 2002/0083550 A1* | 7/2002 | Yang ........................... 15/323 |
| 2002/0089306 A1 | 7/2002 | Kubale et al. |
| 2002/0104184 A1 | 8/2002 | Rogers et al. |
| 2002/0108209 A1 | 8/2002 | Peterson |
| 2002/0121000 A1 | 9/2002 | Tyler |
| 2003/0028994 A1 | 2/2003 | Kitamura et al. |
| 2003/0037403 A1 | 2/2003 | Lang |
| 2003/0070254 A1 | 4/2003 | Ji |
| 2003/0090234 A1* | 5/2003 | Glasgow et al. ............. 320/107 |
| 2003/0101533 A1 | 6/2003 | Noreen et al. |
| 2003/0115714 A1 | 6/2003 | Byung-Sun |
| 2003/0117107 A1 | 6/2003 | Zick et al. |
| 2003/0120389 A1 | 6/2003 | Abramson et al. |

| | | | | | | |
|---|---|---|---|---|---|---|
| 2003/0121120 | A1 | 7/2003 | Ji | GB | 2 311 207 A | 9/1997 |
| 2003/0127932 | A1 | 7/2003 | Ishida et al. | GB | 2 331 919 | 6/1999 |
| 2003/0134189 | A1 | 7/2003 | Kanai et al. | GB | 2 361 100 A | 10/2001 |
| 2003/0145417 | A1 | 8/2003 | Lee | JP | 62-213722 | 9/1987 |
| 2003/0160587 | A1 | 8/2003 | Fan | JP | 3-218722 | 9/1991 |
| 2003/0163891 | A1 | 9/2003 | Nagai et al. | JP | 8-24187 | 1/1996 |
| 2003/0178968 | A1 | 9/2003 | Sakakibara et al. | JP | 8-154871 | 6/1996 |
| 2003/0182758 | A1 | 10/2003 | Hisano et al. | JP | 9-248264 | 9/1997 |
| 2003/0201754 | A1 | 10/2003 | Conrad | JP | 2001-198064 | 7/2001 |
| 2003/0208875 | A1 | 11/2003 | Ito et al. | JP | 2001-321306 | 11/2001 |
| 2003/0217431 | A1 | 11/2003 | Uratani et al. | JP | 2001-321307 | 11/2001 |
| 2004/0088817 | A1 | 5/2004 | Cochran et al. | JP | 2001-321310 | 11/2001 |
| 2004/0088820 | A1 | 5/2004 | Kato et al. | JP | 2002-34862 | 2/2002 |
| 2004/0098822 | A1 | 5/2004 | Martinez et al. | JP | 2002-34873 | 2/2002 |
| 2004/0103493 | A1 | 6/2004 | Moore et al. | JP | 2002-65535 | 3/2002 |
| 2004/0134016 | A1 | 7/2004 | Kisela et al. | JP | 2002-78224 | 3/2002 |
| 2004/0134025 | A1 | 7/2004 | Murphy et al. | JP | 2002-119448 | 4/2002 |
| 2004/0139572 | A1 | 7/2004 | Kisela et al. | JP | 2002-125900 | 5/2002 |
| 2004/0163201 | A1 | 8/2004 | Murphy et al. | JP | 2002-291669 | 10/2002 |
| 2005/0011037 | A1 | 1/2005 | Zhao et al. | JP | 2003-47577 | 2/2003 |
| 2005/0015916 | A1 | 1/2005 | Orubor | JP | 2003-93298 | 4/2003 |
| 2005/0017681 | A1 | 1/2005 | Ogishima et al. | JP | 2003-93301 | 4/2003 |
| 2005/0095499 | A1 | 5/2005 | Kanai et al. | JP | 2003-204910 | 7/2003 |
| 2005/0155177 | A1 | 7/2005 | Baer et al. | JP | 2003-310510 | 11/2003 |
| 2006/0005346 | A1 | 1/2006 | Rupp et al. | JP | 2003-339600 | 12/2003 |
| | | | | JP | 2004-33456 | 2/2004 |
| | | | | JP | 2004-33458 | 2/2004 |

FOREIGN PATENT DOCUMENTS

| | | | |
|---|---|---|---|
| DE | 29 23 588 A1 | 12/1980 | |
| DE | 41 26 320 C2 | 2/1993 | |
| EP | 0 564 817 A1 | 10/1993 | |
| EP | 0 607 059 A1 | 7/1994 | |
| EP | 1 025 961 A1 | 8/2000 | |
| EP | 1 256 306 A3 | 11/2002 | |
| EP | 1 260 170 | 11/2002 | |
| EP | 1 289 032 A1 | 3/2003 | |
| EP | 1 410 751 A2 | 4/2004 | |
| GB | 1 524 254 | 9/1978 | |
| GB | 2 269 475 A | 2/1994 | |
| GB | 2 311 207 | 9/1997 | |

| | | |
|---|---|---|
| JP | 2004-337427 | 12/2004 |
| JP | 2006-95337 | 4/2006 |
| WO | WO 98/29020 | 7/1998 |
| WO | WO 02/074150 A1 | 9/2002 |
| WO | WO 2004/100752 A1 | 11/2004 |
| WO | WO 2005/084511 | 3/2005 |

OTHER PUBLICATIONS

Hitachi Instruction Manual and Safety Instructions for Dust Collector, publicly discolored prior to Jul. 25, 2002.

* cited by examiner

| ITEM | DESCRIPTION | PART NO. | QTY |
|---|---|---|---|
| 1 | ARMATURE | X-17689 | 1 |
| 2 | ARMATURE | X-17691 | 1 |
| 3 | BALL BEARING | 02-04-0645 | 1 |
| 4 | BALL BEARING | 02-04-0844 | 2 |
| 5 | BALL BEARING | 02-04-1000 | 2 |
| 6 | BALL BEARING | 02-04-5130 | 1 |
| 7 | BASE PLATE | X-17709 | 1 |
| 8 | CLUTCH, RC-061008 | X-17695_CLUTCH | 2 |
| 9 | DRIVE SHAFT | X-17694 | 1 |
| 10 | DRIVE SHAFT | X-17695 | 1 |
| 11 | GEAR | X-17731 | 1 |
| 12 | GEAR | X-17731-2 | 1 |
| 13 | MOTOR CAGE | 31-50-0051 | 1 |
| 14 | MOTOR CAGE | 31-50-0052 | 1 |
| 15 | MOTOR MOUNTING | X-17710 | 1 |
| 16 | SPACER | X-17730 | 2 |

SECTION A-A

AIR FLOW-PRODUCING DEVICE, SUCH AS A VACUUM CLEANER OR A BLOWER

RELATED APPLICATIONS

The present application claims the benefit of co-pending Provisional Application Ser. No. 60/578,029, filed Jun. 8, 2004, and co-pending Provisional Application Ser. No. 60/490,190, filed Jul. 25, 2003, the entire specifications of both are hereby incorporated by reference.

FIELD OF THE INVENTION

This invention relates generally to an air flow-producing device and, more particularly, to vacuum cleaners or blowers.

SUMMARY OF THE INVENTION

Typically, an air flow-producing device includes a housing supporting a motor operable to generate an air flow through a passageway. The motor may drive an air flow-generating mechanism, such as a fan.

In a vacuum cleaner, the housing defines a debris chamber to collect and store vacuumed debris therein. The passageway in the housing fluidly connects the debris chamber and the ambient surroundings of the housing. The motor is selectively connectable with a power source to drive the air flow-generating mechanism to create a vacuum within the passageway. As the passageway encounters debris, the vacuum established in the passageway causes the debris to enter the passageway and move toward the debris chamber. Some vacuum cleaners include a conduit coupled to the housing and in fluid communication with the passageway. The conduit may be manipulatable by an operator to vacuum at a location a distance from the housing.

In a blower, the motor creates a positive pressure air flow in the passageway, and, as the passageway encounters debris, the air flow causes the debris to be forced away from the passageway. Some vacuum cleaners may be operated as a blower by providing a passageway at the outlet of the air flow-producing mechanism rather than at the inlet.

Existing vacuum cleaners or blowers and their individual components are not suited for heavy-duty use commonly found at a work site, including impacts from falling objects or from the vacuum cleaner falling or impacting an obstacle. Also, existing vacuum cleaners and blowers and their individual components are not suited for outdoor use, including being exposed to weather (i.e. sun, rain, wind, etc.) and other contaminants (i.e. dirt, sand, gravel, mud, sawdust, etc.). Weather and contaminants can damage the components of the vacuum cleaner and may render the vacuum cleaner inoperable.

Existing portable vacuum cleaners or blowers are typically corded and operate using line power. Since line power is only available through fixed-location power outlets, the existing portable vacuum cleaners typically have long power cords so that the vacuum cleaner may be moved over a large area while being plugged into a particular power outlet. The long power cords can be cumbersome, since they must be constantly moved and re-positioned during the course of operating the vacuum cleaner. Also, the length of the power cord determines the size of the area that may be vacuumed before having to switch power outlets to continue vacuuming outside the area determined by the previous power outlet. Further, a power outlet may not even be available near the location to be vacuumed. As a result, an extension to the power cord must be employed to reach to the nearest power outlet.

Some existing portable vacuum cleaners utilize a remote control positioned near the portion of the vacuum cleaner grasped by the operator. The remote control, therefore, may allow the operator to control operation of the vacuum cleaner with the same hand as that used to grasp and manipulate the vacuum cleaner. However, such vacuum cleaners with remote controls are typically corded, and suffer from the same restrictions as those described above.

Existing vacuum cleaners or blowers require excessive power consumption upon start-up of the electric motor. Typically, the electric motor is required to work harder upon start-up of the vacuum cleaner to bring up to speed an impeller, or a fan, which is typically coupled to the electric motor and rotatable, to create the vacuum in the passageway. The amount of time required to bring the fan up to steady-state operating speed is dependent upon the amount of air that must be initially drawn from the passageway to establish the air flow (e.g., vacuum) in the passageway. To perform the extra work, the electric motor draws more power from the power source. This is wasteful, especially with a limited power source, such as a battery. Upon reaching a steady-state operating speed, the power consumption from the power source typically decreases.

The present invention provides an air flow-producing device, such as a vacuum cleaner, blower, etc., which substantially alleviates one or more of the above-described and other problems with existing vacuum cleaners or blowers. In some aspects, the vacuum cleaner or blower includes a battery charger for charging power tool batteries. In some aspects, the vacuum cleaner or blower is "heavy-duty" and is designed to be used outdoors and/or in harsh working conditions.

More particularly, in some aspects, the invention provides an electrical component generally including a housing defining a passageway and having an outer surface, a motor supported by the housing and selectively electrically connectable with a power source, a fan connected to the motor to generate an airflow through the passageway, a battery supported on the outer surface of the housing, and a base connected to the housing for supporting the housing on a surface. The base extends beyond the outer surface of the housing and beyond the battery. The electrical component also includes a bar connected to at least one of the housing and the base, the bar extending beyond the outer surface of the housing.

Also, in some aspects, the invention provides an electrical component generally including a housing defining a passageway, a motor supported by the housing and selectively electrically connectable with a power source, a fan connected to the motor to generate an airflow through the passageway, and a vent defined by the housing. The vent releases heated air from the housing and impedes entry of contaminants into the housing. The vent causes the heated air to turn downwardly through the vent before being released from the housing. The housing further defines a drain configured to release contaminants from the housing.

In addition, in some aspects, the invention provides an electrical component generally including a housing defining a passageway, a motor supported by the housing and selectively electrically connectable with a power source, a fan connected to the motor to generate an airflow through the passageway, and a battery port connected to the housing and operable to support a battery. The battery port includes a battery terminal electrically connectable to the motor to electrically connect the battery to the motor. The battery port also includes a battery terminal support defining an opening. The battery terminal is supported in the opening. A battery terminal cover is supported by the battery port, and the battery terminal cover closes the opening when the battery is not supported by the battery port.

Further, in some aspects, the invention provides an electrical component generally including a housing defining a passageway. The housing also includes a support portion having a housing projection and a housing groove. The electrical component also generally includes a motor supported by the housing and selectively electrically connectable with a power source, a fan connected to the motor to generate an airflow through the passageway, an electric circuit supported by the housing and selectively electrically connectable with the power source, and a power-tool battery electrically connectable with the circuit such that power is selectively transferred between the battery and the circuit. The battery includes a battery support portion having a battery projection and a battery groove. The battery projection is engageable with the housing groove, and the housing projection is engageable with the battery groove to connect the battery to the housing.

Also, in some aspects, the invention provides an electrical component generally including a housing, an electric circuit supported by the housing and selectively electrically connectable with a power source, a first battery connected to the housing and selectively electrically connectable with the circuit such that power is selectively transferable between the first battery and the circuit, a second battery connected to the housing and selectively electrically connectable with the circuit such that power is selectively transferable between the second battery and the circuit, and a controller electrically connected with the circuit, the first battery, and the second battery. The controller is operable to electrically connect at least one of the first battery and the second battery to the circuit.

In addition, in some aspects, the invention provides an electrical component generally including a housing defining a passageway, a motor supported by the housing and selectively electrically connectable with a power source, a fan connected to the motor to generate an airflow through the passageway, a hose connected to the housing and in fluid communication with the passageway such that the airflow passes through the hose. The hose is manipulatable by a user. The electrical component also includes a battery connected to the housing and selectively electrically connectable with the motor such that power is selectively transferred between the battery and the motor, and a remote control supported on the hose. The remote control is operable by the user to selectively electrically connect the battery and the motor to selectively operate the fan. The remote control may be operable to select a mode of operation of the electrical component and a speed of the motor.

Also, in some aspects, the invention provides an electrical component generally including a housing defining a passageway, a motor supported by the housing and selectively electrically connectable with a power source. The motor is operable at a first speed. The electrical component also includes a fan supported by the housing and selectively driven by the motor. The fan is operable to generate an airflow through the passageway. The electrical component further includes a door positioned in the passageway and movable to affect the airflow through the passageway, and a controller operably connected with the motor and the door. The controller is operable to allow movement of the door when the motor operates at the first speed.

In addition, in some aspects, the invention provides an electrical component generally including a housing defining a passageway, a first motor supported by the housing and selectively connectable with a first power source, and a second motor different from the first motor. The second motor is supported by the housing and selectively connectable with a second power source different from the first power source. The electrical component also includes a fan connected to at least one of the first motor and the second motor to generate an airflow through the passageway.

Further, in some aspects, the invention provides an electrical component generally including a housing defining a passageway, a motor supported by the housing and selectively electrically connectable with a power source, a fan connected to the motor to generate an airflow through the passageway, and a charging circuit supported by the housing. The charging circuit is electrically connectable with the power source and with a power-tool battery. The charging circuit is operable to charge the power-tool battery.

Also, in some aspects, the invention generally provides an LED positioned at least partially outside of the housing and electrically connected to the charging circuit, the LED being operable to display a charge status of the power-tool battery. A translucent cover is connected to the housing and at least partially encloses the LED.

In addition, in some aspects, the invention generally provides a charging routine having a temperature rate termination technique. This charging routine is designed to function with, for example, Nickel-Metal Hydride (NiMH), Nickel-Cadmium (NiCd), Lithium-ion (Li-ion) etc. battery cells and includes a maintenance routine and boost routine that follows the normal charge execution of the battery.

Further, in some aspects, the invention generally provides a multiple-port battery charger including a separate and dedicated charging circuit for each charging port. This configuration allows the remaining charging circuits to be operable if one charging circuit should fail.

In some aspects of the invention, the heavy-duty construction of the electrical component allows the electrical component and its sub-components to withstand impacts after falling several feet or being impacted by other objects, in addition to protecting an attached battery from jarring loose as a result of the impact.

In some aspects of the invention, the contaminant-resistant air vents prevent any liquid or solid contaminants from entering the housing. Also, a series of drains may be incorporated within the housing to purge any contaminant that may enter the housing, and the charging circuits are suspended and kept out of contact from such contaminants.

In some aspects of the invention, a battery terminal cover prevents any contaminants from contacting the battery terminals when a battery is not connected with the electrical component. The cover also provides a sweeping action to keep clean the interconnection between the battery terminals and the battery.

In some aspects of the invention, LED charge status indicators are bright enough to see in the outdoor sunlight and are viewable from a long distance about a wide range of viewing angles.

In some aspects of the invention, the temperature rate termination technique of the charging routine reduces charge time by several minutes, reduces heat due to charging, and/or increases the cycle life of the battery.

In some aspects of the invention, the independent charging circuits provide the user increased reliability such that a failure of one charging circuit does not result in a complete failure of the multiple port battery charger.

Independent features and independent advantages of the present invention will become apparent to those skilled in the art upon review of the following detailed description and drawings.

Figure 1:
FIG. 1 is a front perspective view of a first construction of an air flow-producing device, such as, for example, a vacuum cleaner.

Before at least one embodiment of the invention is explain in detail, it is to be understood that the invention is not limited in its application to the details of the construction and arrangements of the components set forth in the following description or illustrated in the drawings. The invention includes other embodiments and can be practiced or carried out in various different ways. Also, it is understood that the phraseology and terminology used herein is for the purpose of description and should not be regarded as limiting. The use of "including," "comprising," or "having" and variations thereof is meant to encompass the items listed thereafter and equivalents thereof as well as additional items. Unless limited otherwise, the terms "connected," "coupled," and variations thereof herein are used broadly and encompass direct and indirect connections and couplings. In addition, the terms "connected" and "coupled" and variations thereof are not restricted to physical or mechanical connections or couplings.

DETAILED DESCRIPTION

Constructions of an air flow-producing device, such as, for example, a vacuum cleaner 10, embodying independent aspects of the invention are illustrated in FIGS. 1-35. It should be understood that the independent aspects of the invention disclosed herein may be incorporated in any of the vacuum cleaner constructions illustrated in FIGS. 1-35. As such, the same reference numeral will be used to reference each vacuum cleaner construction illustrated in FIGS. 1-35. It should be understood that, in some aspects, the air flow-producing device may be another air flow-producing device, such as, for example, a blower. It should also be understood that some independent aspects of the invention may be applied to another type of device, such as, for example, a power tool (e.g., hand-held or stationary), audio device, video device, etc.

In general, in some aspects, the vacuum cleaner 10 is constructed for heavy-duty use in harsh working environments (for electrical equipment) such as outdoor construction sites, machine shops, manufacturing floors, etc. The vacuum cleaner 10 may be configured to operate using batteries 14, such as, for example, 12V, 14.4V, 18V, 24V, 28V or similar power tool or other equipment batteries of various chemistries (NiCd, NiMH, Li-ion, etc.). However, the vacuum cleaner 10 may also be configured to operate using line power via an electrical cord 18. In some aspects, the vacuum cleaner 10 may also be configured to charge the batteries 14.

As shown in FIG. 1, the vacuum cleaner 10 includes a housing 22 generally defining a passageway 26 and a debris chamber 30. The passageway 26 fluidly connects the debris chamber 30 and the ambient surroundings of the housing 22, such that debris moving through the passageway 26 is collected and stored in the debris chamber 30. An openable cover 32 closes the debris chamber 30 and allows the debris chamber 30 to be emptied. A latch 33 secures the cover 32, and a seal (not shown) ensures that the debris chamber 30 is substantially air tight when the cover 32 is in a covering position (shown in FIG. 1). The cover 32 may be pivotable or otherwise movable between the covering position (shown in FIG. 1) and the emptying position (not shown). Alternatively, the cover 32 may be removable from the housing 22 to empty the debris chamber 30.

A vacuum may be established in the passageway 26 by a fan 34 that is connected to and selectively driven by an electric motor 38. The electric motor 38, depending on the configuration of the vacuum cleaner 10, may receive power from the electrical cord 18 or the batteries 14 or from both, selectively. The motor 38 and/or the fan 34 may be supported on the cover 32 or on the housing 22.

The housing 22 may be manufactured using any of a number of different methods. In one construction, the housing 22 may be manufactured of a plastic material as a two-piece design. A first shell may be connected to a second shell to form a cavity therebetween. A tongue and a groove may be utilized to mate the two shells and an o-ring may be positioned between the two shells to seal the interface between the two shells. This particular construction is not illustrated, however it may be substantially similar to the construction of the electrical device shown and described in U.S. Patent Application Publication No. 2003/0090234 (the "'234 Application"), the entire contents of which is hereby incorporated by reference. Alternatively, the housing 22 may be formed as a single piece and cooperate with the cover 32 to define the debris chamber 30.

The housing 22 may also be molded to define a low spot of the housing 22. A drain may be positioned in the low spot to release any contaminant (i.e. dirt, sand, gravel, sawdust, metal shavings, water, oil, grease, etc.) that may enter a portion of the housing 22 (such as a portion including the motor 38, the fan 34, electrical circuitry, etc.).

In some constructions and in some aspects, the vacuum cleaner 10 may also include one or more battery ports 42 for supporting one or more batteries 14. The one or more battery ports 42 may correspond with one or more electrical circuits 46, which may be or include battery charging circuits/components. The circuits 46 may be supported by suspended and cushioned mounting boards housed within the cavity. The mounting boards are made of a flame-retardant material, such as a VØ-rated plastic. The circuits 46 and the mounting boards may be formed as an assembly, and the circuits 46 may be potted in the flame retardant material to seal and insulate the components of the circuits 46. The components of the circuits 46 may be supported on the mounting boards with required spacing, sealing and insulation to meet UL requirements. The battery ports 42, the circuits 46, and the connections therebetween are explained in more detail in the '234 Application. In some constructions and in some aspects, one or more of the circuits 46 may include a battery charging circuit portion operable to charge a battery 14 connected to the associated battery port 42.

The cushioned mounting configuration of the mounting boards protects the circuits 46 during an impact. Such cushioning may be provided by any elastically deformable material (not shown), such as, for example, rubber washers, positioned between the board and housing 22.

This mounting configuration also helps minimize exposure of the circuits 46 to any contaminant (e.g. dirt, sand, gravel, sawdust, metal shavings, water, oil, grease, etc.) that may enter the cavity. Any contaminant entering the cavity will come to rest along an interior wall or adjacent walls of the housing 22, depending on the orientation of the housing 22. Therefore, with the circuits 46 suspended in the cavity, it is unlikely any contaminants will contact or come to rest on the circuits 46.

The circuits 46 may be connectable to a power source (not shown), such as an AC power source through the electrical cord 18, or a DC power source. Battery terminals 50 on the battery ports 42 connect the batteries 14 to the circuits 46.

In the illustrated construction, a separate and dedicated circuit 46 is matched with each battery port 42. With this configuration, if one circuit 46 fails, the remaining circuits 46 will be operable. Each circuit 46 may be similar to the charging circuit 46 described in U.S. Pat. No. 6,222,343, issued Apr. 24, 2001, and U.S. Pat. No. 6,456,035, issued Sep. 24, 2002, the entire contents of both are hereby incorporated by reference. Further, the charging of the batteries 14 may be controlled by a temperature rate ("TR") termination protocol, which is described in more detail in the '234 Application.

In some constructions and in some aspects, the vacuum cleaner 10 may thus be used as a battery charger for the batteries 14. The charged batteries 14 may then be used to power the vacuum cleaner 10 or to power another battery-powered device, such as, for example, a cordless power tool, video or audio component, etc.

An operational circuit 54 electrically connecting the motor 38 and at least one of the battery 14 and the electrical cord 18 may also be supported and/or suspended in the cavity of the housing 22 along with the circuits 46 and in a similar manner.

Air vents may be defined in housing 22 to allow an airflow to pass through the housing 22. Multiple sets of air vents may be defined in the housing 22, such that some sets of vents may be at a higher elevation than other sets of vents. The air vents include ascending and stepped passageways into the cavity. Structure defining each passageway includes an outer lip, a spacer portion, which may have a substantially flat surface, and an inner lip toward the end of the portion. This structure helps to prevent any solid (i.e. dirt, sand, sawdust, metal shavings, etc.) or liquid (i.e. water, oil, grease, etc.) contaminants from entering the cavity. The outer lip will deflect contaminants. To enter the cavity, the structure of the air vents requires any contaminant to first penetrate the exterior of the housing 22, move along the substantially flat surface of the portion, and then ascend past the level defined by the inner lip. This tortuous path prevents unforced entry of any solid or liquid contaminants into the housing 22. However, if contaminants were to enter the cavity, such contaminants would be released through the drain. The air vents are described in more detail in the '234 Application.

Generally, heat is generated during operation of the circuits 46 and 54. Through unforced convection, a cooling airflow may be drawn through air vents that are at a lower elevation in the housing 22 into the cavity to flow across the heated circuits 46 and/or 54. The cooling airflow is heated by the circuits 46 and/or 54, causing the heated air to rise and escape the cavity through air vents that are at a higher elevation in the housing 22.

In other constructions, the vacuum cleaner 10 may utilize an electrically-operated fan (e.g., the fan 34 or a separate fan (not shown)) to cool the heated circuits 46 and/or 54 rather than unforced convection through air vents. Also, heat removal elements (not shown) such as, for example, heat sinks, heat pipes, etc. may be incorporated into the housing 22 to draw heat from the circuits 46.

The housing 22 is mounted to a base 58 which is designed to buffer and cushion the housing 22 along the edges of the base 58. The base 58 may be blow molded from a high density polyethylene (HDPE) which is a very strong and impact-resistant material. This material selection allows the base 58 to more effectively absorb the energy associated with an impact. The base 58 may also include a uniform wall thickness of about 0.100" around the base 58 to prevent its collapse (especially near the corners) when the base 58 is impacted after a fall or some other impacting event.

The base 58 may also include a drain (not shown) positioned at a low spot molded into the base 58. The drain in the housing 22 and the drain in the base 58 are in fluid communication but are offset from each other so that direct access to the cavity through both of the drains is inhibited. Any contaminants that enter the housing 22 can be released through both of the drains. The air vents and the base 58 are shown and described in more detail in the '234 Application.

Figure 2:
FIG. 2 is a front perspective view of a second construction of a vacuum cleaner.
Figure 3:
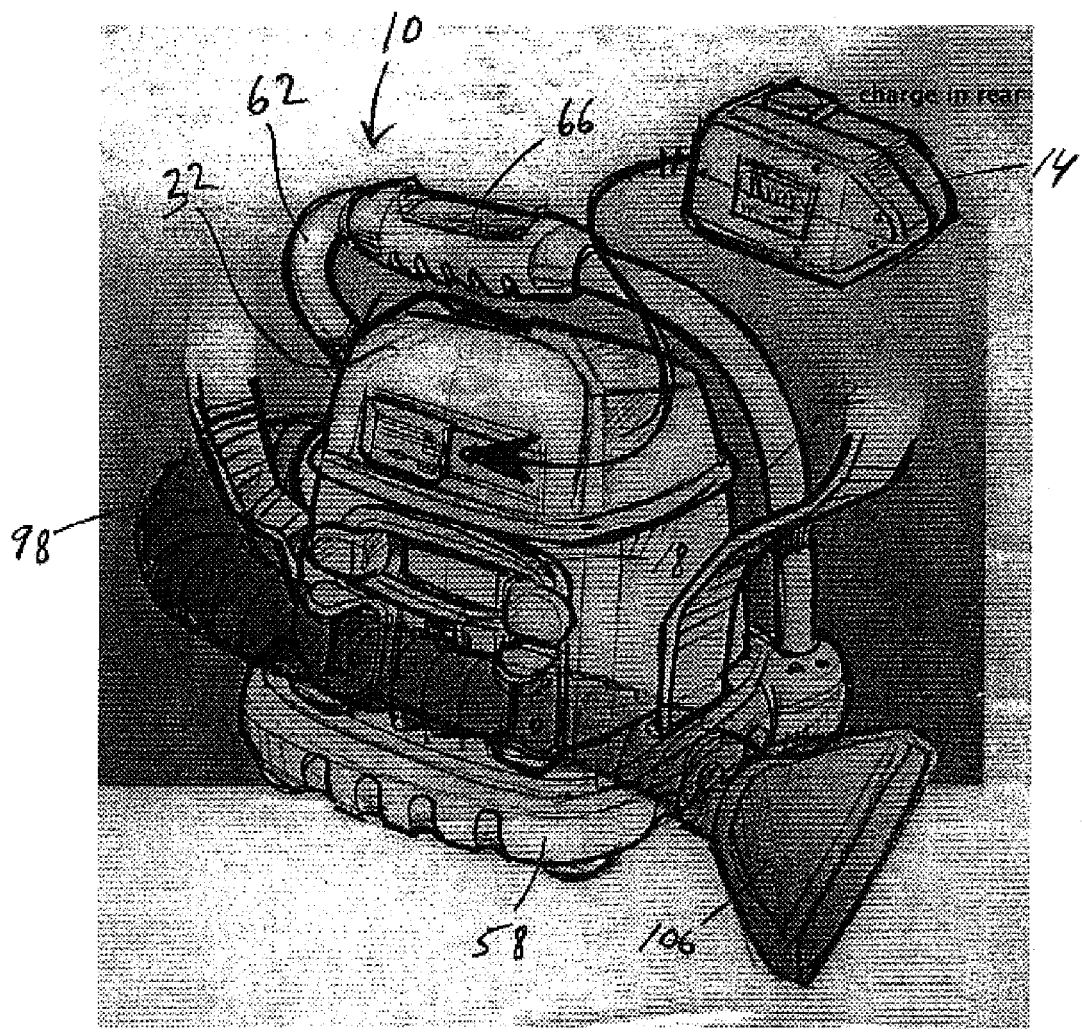
FIG. 3 is a rear perspective view of the vacuum cleaner of FIG. 1.
Figures 4, 5:
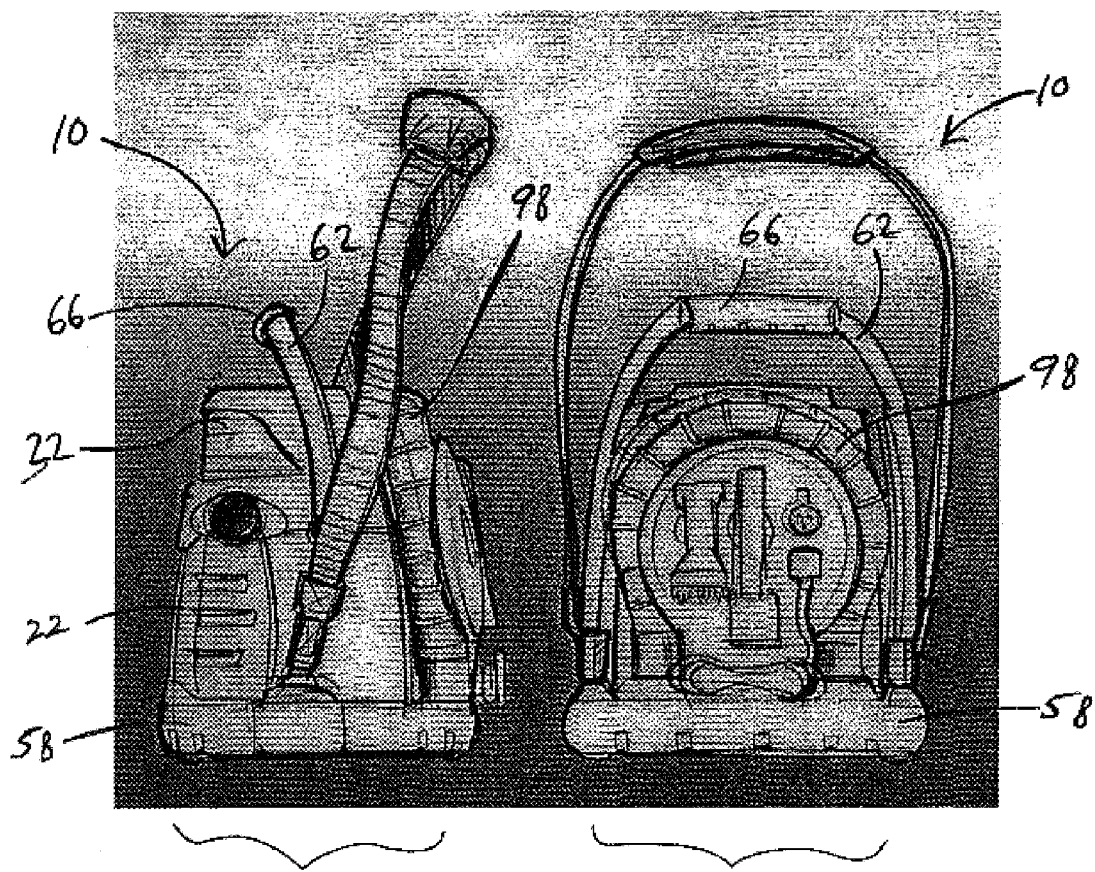
FIG. 4 is a side view of a third construction of a vacuum cleaner.
FIG. 5 is a rear view of the vacuum cleaner of FIG. 4.

A handle 62 is connected to at least one of the housing 22 and the base 58. As shown in FIG. 1, the handle 62 is connected to the base 58 only, while FIG. 2 illustrates the handle 62 being connected to both the base 58 and the housing 22. The handle 62 may be generally positioned towards the portion of the vacuum cleaner 10 where the battery 14 attaches to the battery port 42. The handle 62 may include some portions connected to the housing 22 through impact-absorbing bumpers and other portions connected to the base 58. The bumpers are designed to both absorb and dampen impact energy. The bumpers may be made of an elastomeric material, such as polyurethane or natural rubber, with spring and/or damping characteristics. An ergonomic grip 66 may be centrally positioned on the handle 62 to provide a comfortable, sure and steady grip on the handle 62. The grip 66 may include an elastic, non-slip material covering to provide comfort while the vacuum cleaner 10 is carried.

The handle 62 allows the user to carry the vacuum cleaner 10 to and from a work site. An attached battery 14 may be generally encompassed by a boundary defined by the base 58 and handle 62. As a result, the handle 62 may also function as a "roll bar," or protective structure. The handle 62 is shown and described in more detail in the '234 Application. The handle 62 may be movable relative to the housing 22. In one position, the handle 62 may act to secure the cover 32 to the housing 22 (in combination with or in place of the latch 33), and, in another position, the handle 62 may allow the cover 32 to be opened to the emptying position.

The vacuum cleaner 10 may include a cover or multiple covers (not shown) to enclose or partially enclose the one or more batteries 14. The one or more battery ports 42 may be recessed within the housing 22 such that the cover or multiple covers are contoured to follow the outer surface of the housing 22. The cover or multiple covers may be removable/retractable manually or with insertion of the battery 14.

Bumpers may also be coupled to the housing 22 to absorb some of the energy upon impact, thereby decreasing the chance of jarring loose an attached battery 14 and decreasing the chance of breaking the vacuum cleaner 10 or the subcomponents of the vacuum cleaner 10. The bumpers may be positioned along all sides of the housing 22 to protect the respective sides of the housing 22. The bumpers may be made of an impact-resistant and energy absorbing material, such as HDPE. The bumpers are shown and described in more detail in the '234 Application.

In the illustrated construction of FIG. 1, one battery port 42 is provided by the vacuum cleaner 10. In the illustrated construction of FIG. 2, two battery ports 42 are provided by the vacuum cleaner 10. In other constructions (not shown) and in some aspects of the invention, the vacuum cleaner 10 may include more than two battery ports 42. Generally, each battery port 42 may support and electrically connect a battery 14 with the circuit 46 and/or to the operational circuit 54. The vacuum cleaner 10 and the housing 22 can be configured to accommodate any number of battery ports 42 and still be within the spirit and scope of the present invention.

Figure 6:
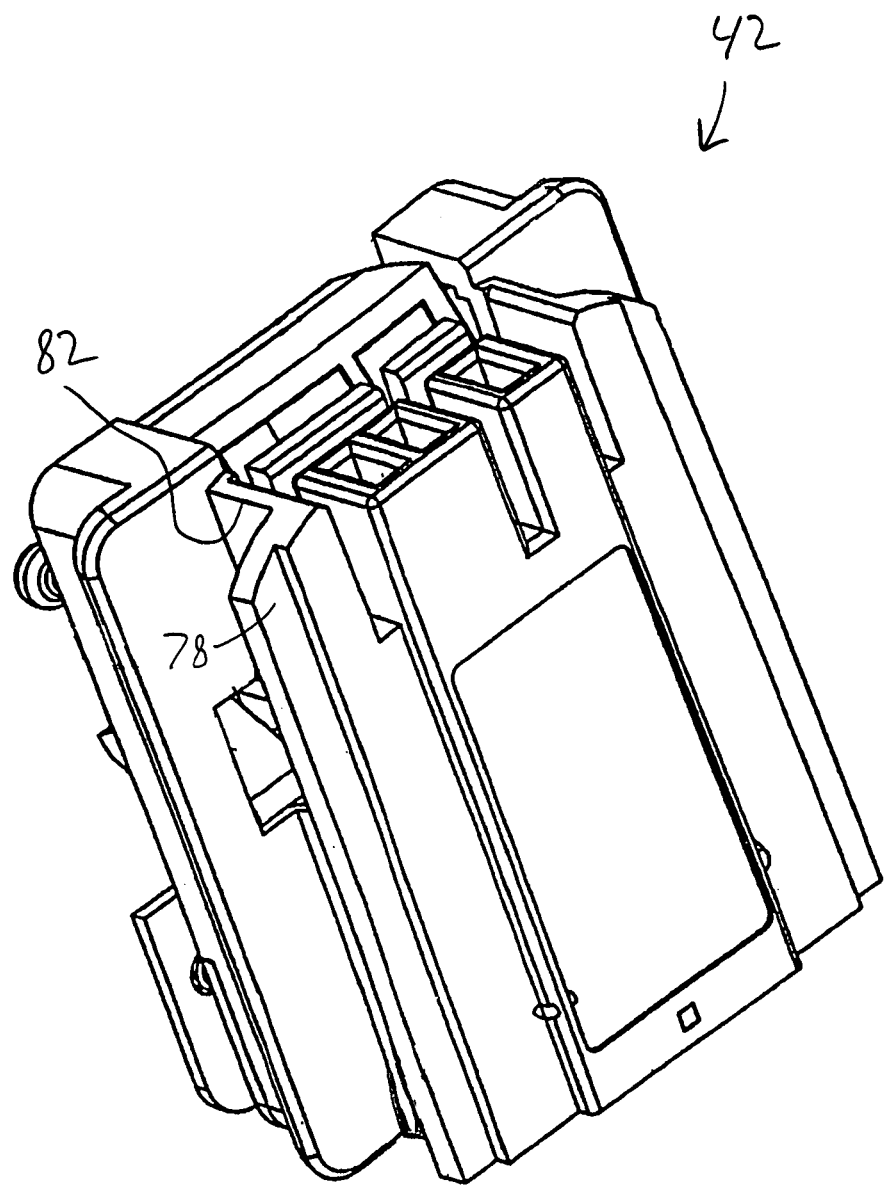
FIG. 6 is a front perspective view of a battery port.
Figure 7:
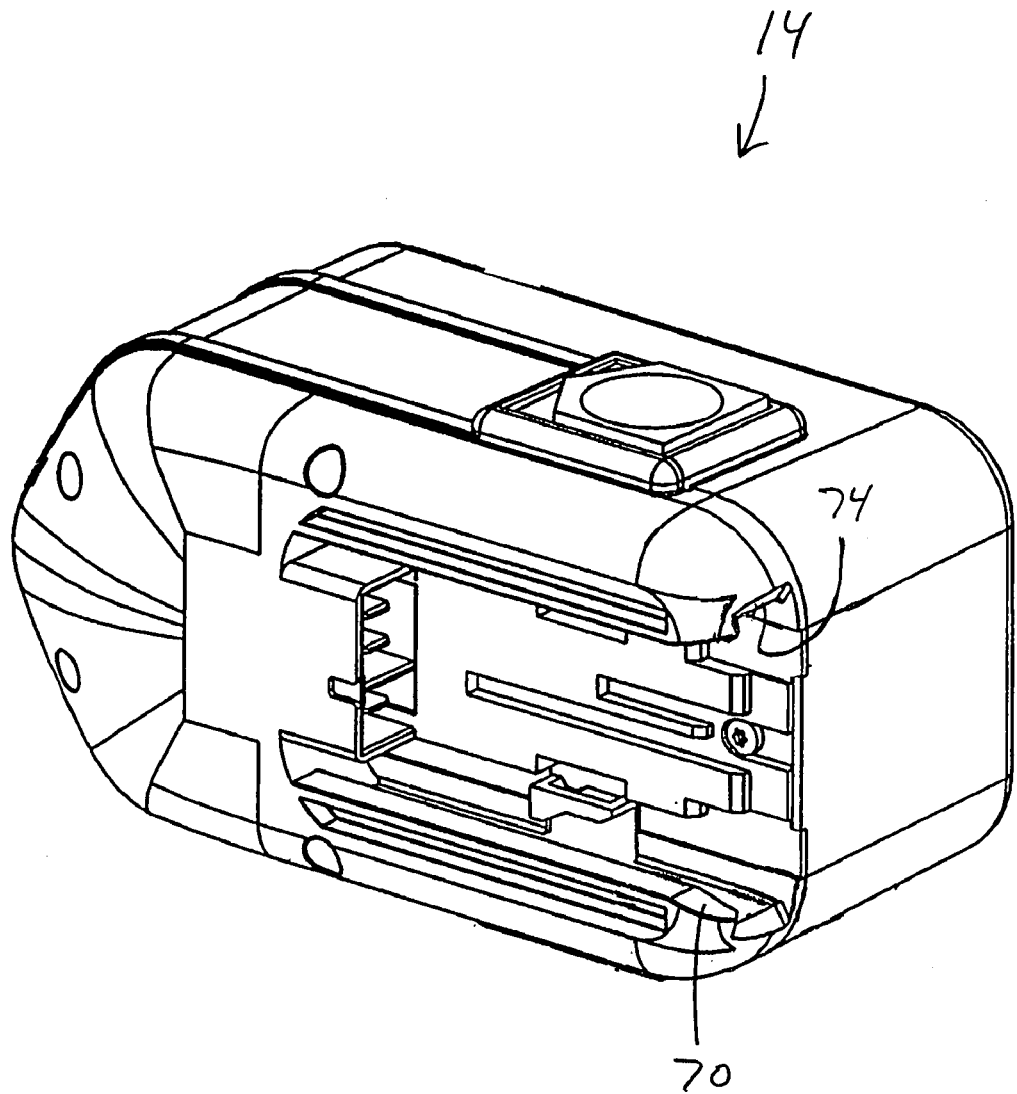
FIG. 7 is a front perspective view of a power-tool battery that is connectable to the battery port of FIG. 6.

As shown in FIG. 6, the battery 14 is a slide-on power-tool battery 14 and includes a battery projection 70 and a battery groove 74. As shown in FIG. 7, the battery port 42 includes a battery port projection 78 and a battery port groove 82. The battery port projection 78 is engageable with the battery groove 74, and the battery projection 70 is engageable with the battery port groove 82 to connect the battery 14 and the battery port 42. Further detail regarding the structural connection and the electrical connection between the battery ports 42 and the batteries 14 may be found in the '234 Application.

Figure 8:
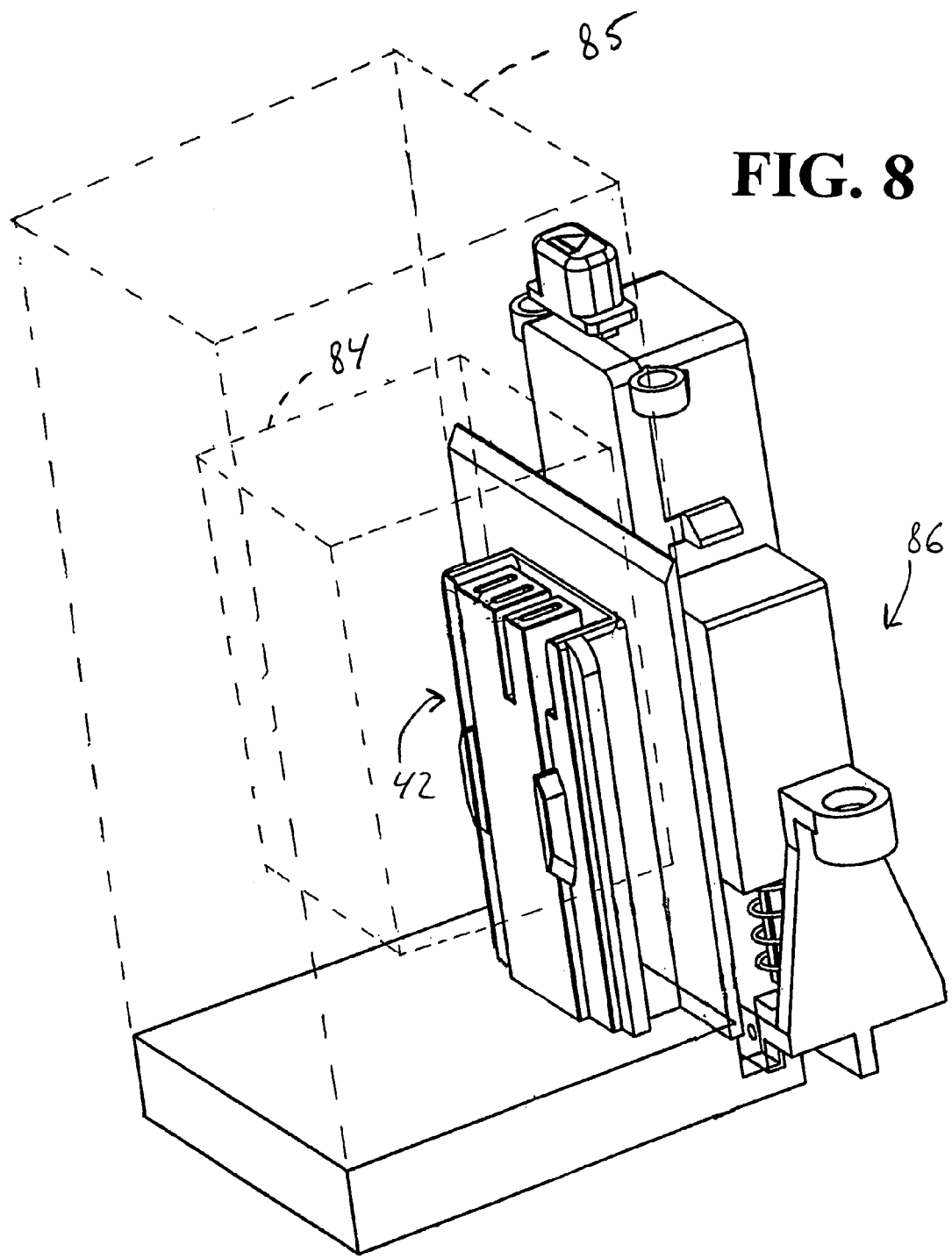
FIG. 8 is a perspective view of structure allowing a battery port to be moved relative to a housing.

The battery ports 42 may also be configured to be movable relative to the housing 22. This feature accommodates both smaller-sized batteries 84 and larger-sized batteries 85 when connected to the battery port 42. For example, if a battery port 42 is positioned in the housing 22 such that a portion of or the entire the battery 14 is to be enclosed within the boundaries defined by the outer surface of the housing 22, the battery port 42 would be movable into the housing 22 to allow a larger-sized battery 85 to be enclosed (entirely or at least partially) within the boundaries defined by the outer surface of the housing 22. Such structure 86 is illustrated in FIG. 8, and shown and described in more detail in U.S. Patent Application Publication No. 2003/0117107 (the "'107 Application"), the entire contents of which is hereby incorporated by reference.

The vacuum cleaner 10 may also include one or more status indicators, including light-emitting diodes ("LED"), that are electrically connected with each circuit 46 to relay status information to the user (e.g., the charging status of each battery 14). The LEDs are designed to emit an amount of light necessary to overcome the intensity of outdoor sunlight. The LEDs are positioned outside of the housing 22 so that the outer perimeter is generally viewable from any direction relative to the housing 22. Further detail regarding the charge status indicators may be found in the '234 Application.

Figure 9:
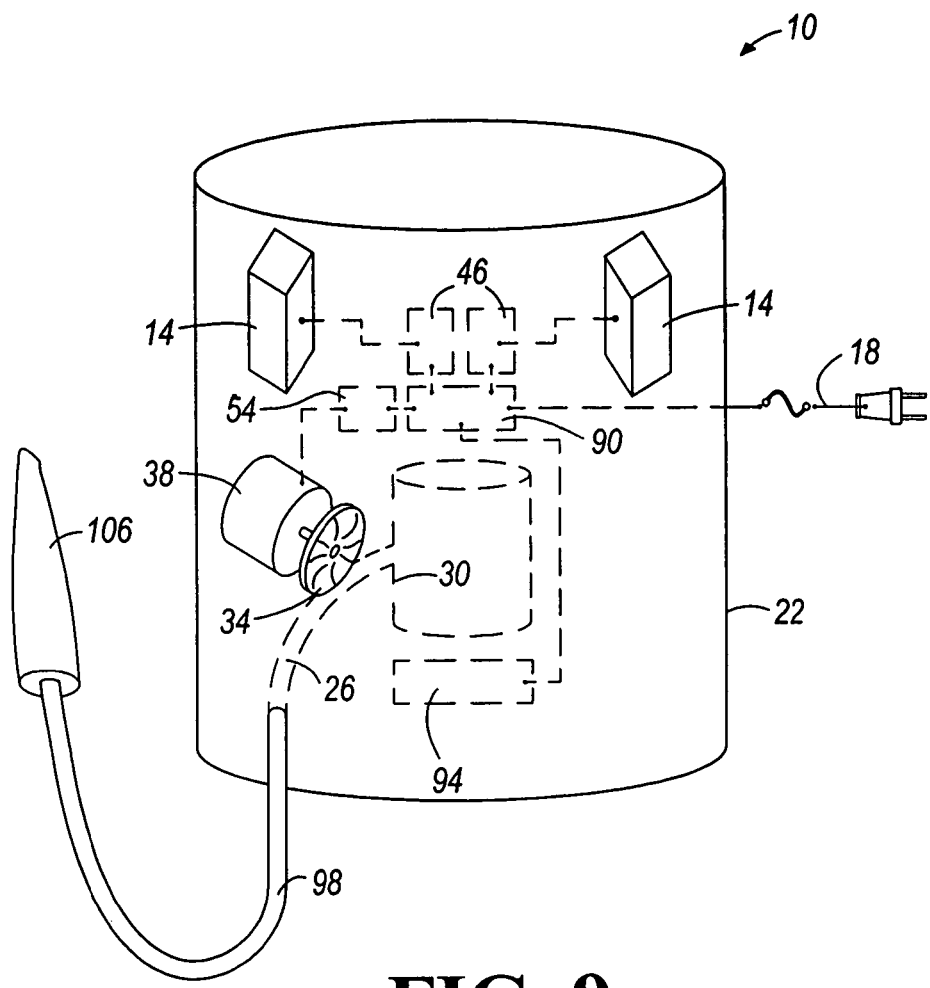
FIG. 9 is a schematic view of the vacuum cleaner of FIGS. 1, 2, and 4, illustrating multiple batteries being supported by a housing.
Figure 10:
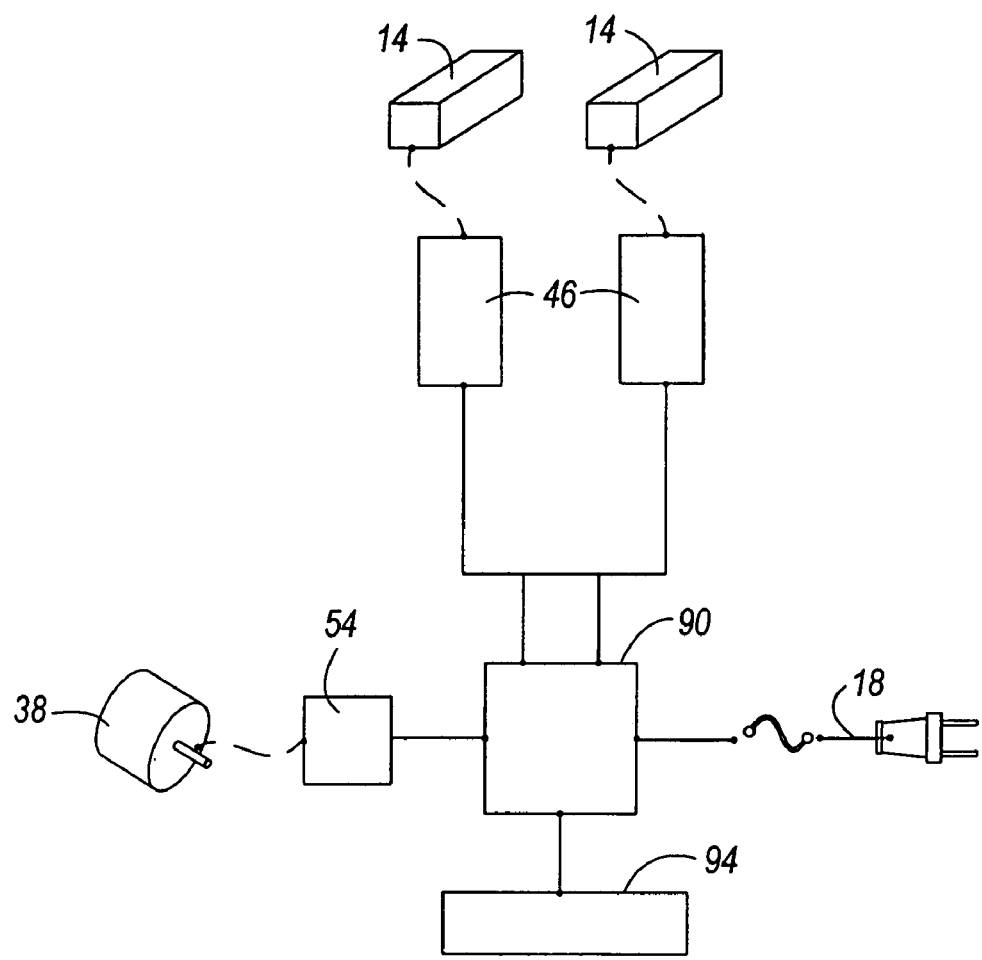
FIG. 10 is an electrical schematic showing various electrical components and their interconnection.

With reference to FIG. 9, the vacuum cleaner 10 is schematically shown to include two batteries 14 supported thereon. Each battery 14 is connected to the housing 22 via a battery port 42. Each battery port 42, in turn, is electrically connected to a circuit 46. Both circuits 46 are shown electrically connected to a power distribution circuit 90, which in turn is electrically connected to the operational circuit 54. The power distribution circuit 90 is electrically connectable to line power when the electrical cord 18 is plugged into an electrical outlet. A controller 94 is electrically connected with the power distribution circuit 90 to control the interaction between the circuits 46, 54, 90. The arrangement of the power distribution circuit 90, the circuits 46, the operational circuit 54, and the controller 94 is illustrated in FIG. 10, and is generally shown and described in the '107 Application.

The fan 34 is shown positioned at least partially extending into the passageway 26 to create an airflow when driven by the motor 38. The motor 38 is shown electrically connected to the operational circuit 54, which is responsive to the controller 94 to selectively activate the motor 38. A conduit, or hose 98, is coupled to the housing 22 such that the hose 98 is in fluid communication with the passageway 26. The hose 98 is manipulatable by a user for vacuuming debris. The debris is collected and stored in the debris chamber 30.

Upon activation of the vacuum cleaner 10, the controller 94 may electrically connect one or more of the batteries 14 with the motor 38. The operational circuit 54 may be configured to draw power from more than one battery 14 at any time to power the motor 38. The operational circuit 54 may also be configured to draw power from one battery 14, then switch to draw power from another battery 14. Since the discharge of the batteries 14 may be controlled by the operational circuit 54, the run time of the vacuum cleaner 10 may be extended. As a result, the user of the vacuum cleaner 10 may continue to operate the vacuum cleaner 10, even when one of the batteries 14 has been drained.

Figure 11A:
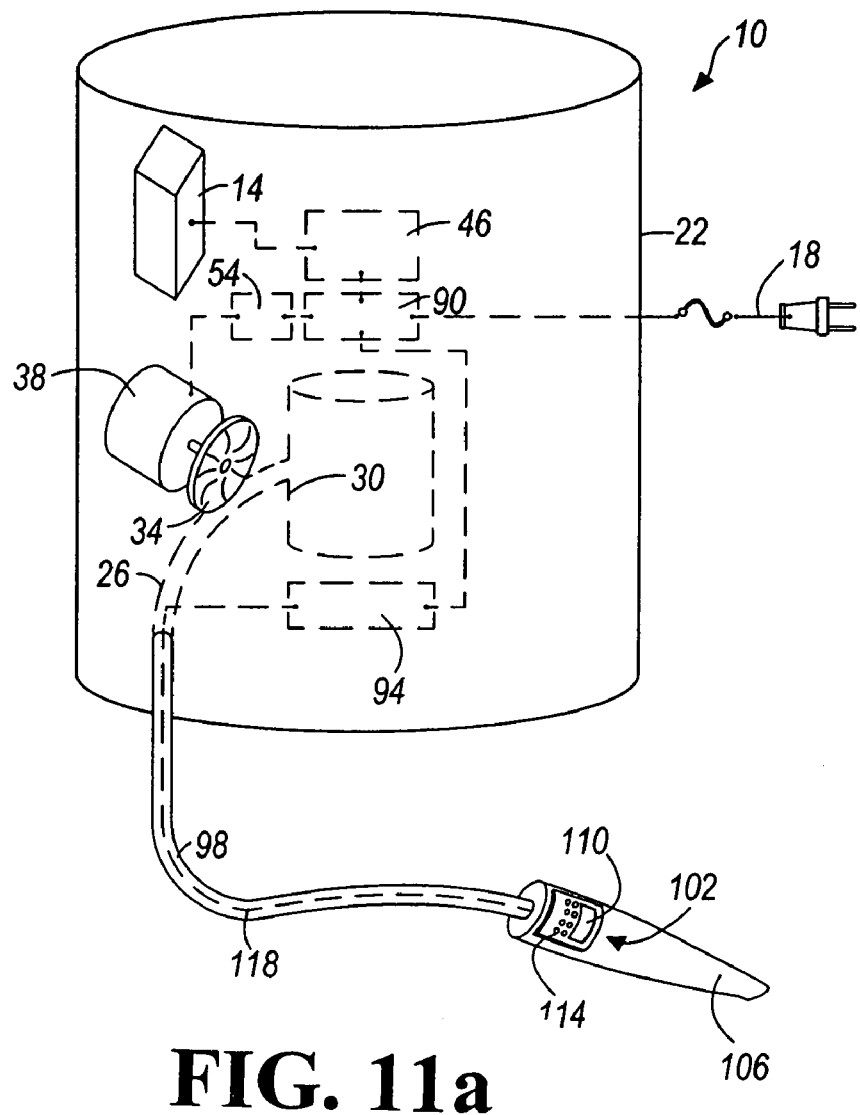
FIG. 11a is a schematic view of the vacuum cleaner of FIGS. 1, 2, and 4, illustrating a wired remote control coupled to a hose extending from the housing.

FIG. 11a illustrates the vacuum cleaner 10 including a wired remote control 102 coupled to a vacuum accessory 106 that is coupled to the hose 98. The vacuum cleaner 10 is substantially similar to that shown in FIG. 9, as such, like components will be labeled with like reference numerals.

The remote control 102 may include a display panel 110 and any number of conventional switches and/or buttons 114 for controlling operation of the vacuum cleaner 10. A wire 118 may electrically connect the remote control 102 and the controller 94. The wire 118 may be externally mounted to the hose 98, or, the wire 118 may be internally mounted within the hose 98. The user may operate the vacuum cleaner 10 using the remote control 102. For example, the user may be able to turn the vacuum cleaner 10 on or off, or change operating speeds of the motor 38. The user may also be able to view the charge levels of the batteries 14 via the display panel 110.

Figure 11B:
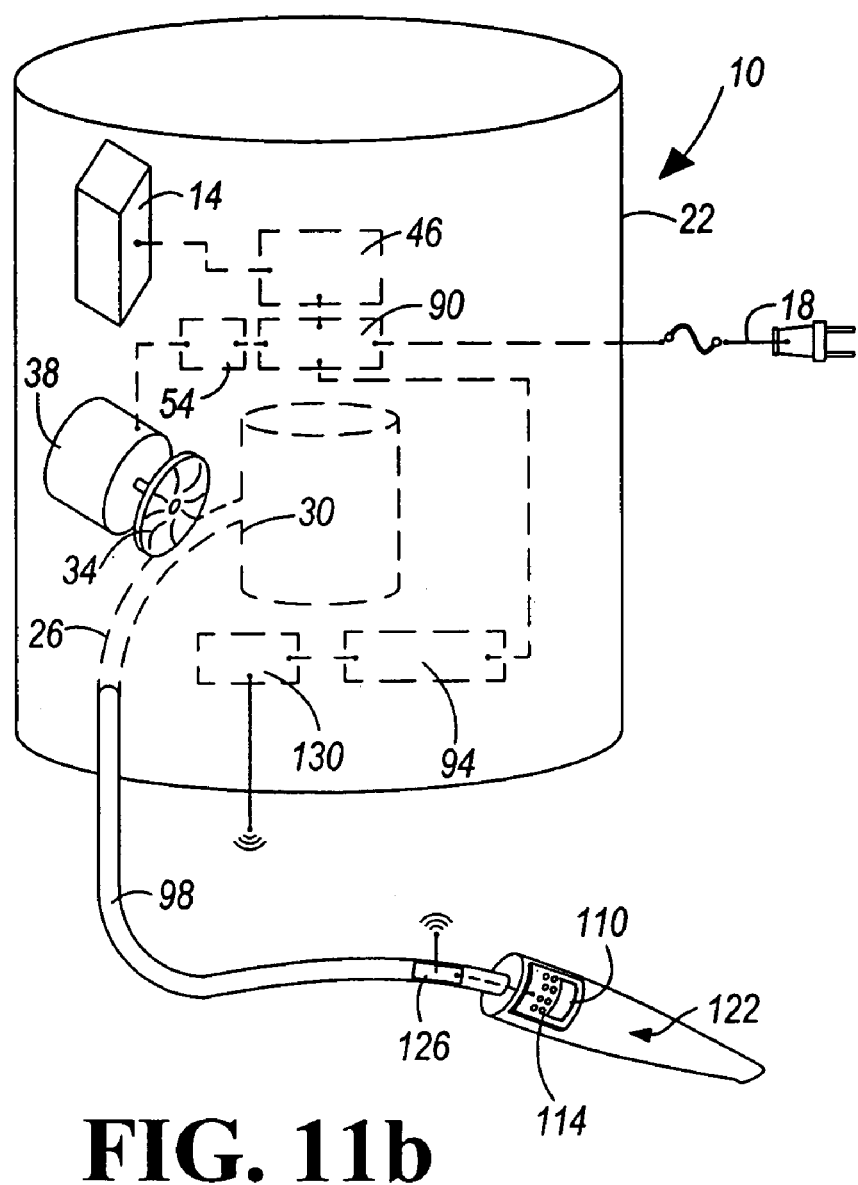
FIG. 11b is a schematic view of the vacuum cleaner of FIGS. 1, 2, and 4, illustrating a wireless remote control coupled to the hose.

FIG. 11b illustrates the vacuum cleaner 10 including a wireless remote control 122 coupled to the vacuum accessory 106. The remote control 122 may include a display panel 110 and buttons 114 like that shown in FIG. 11a, however, a transmitter 126 may be mounted in the vacuum accessory 106 or the hose 98 for transmitting radio signals to a receiver 130, which may be positioned in the housing 22. The receiver 130, in turn, receives the radio signals from the transmitter 126 and relays an appropriate signal to the controller 94.

In some aspects, the remote control 102 or 122 enables power conservation when the user is operating with the hose 98 at a distance from the housing of the vacuum cleaner 10. The user can position inlet of the hose 98 adjacent to debris before turning on the vacuum cleaner 10 and may then turn off the vacuum cleaner 10 while moving the hose 98 to other sites of debris.

Figure 11C:
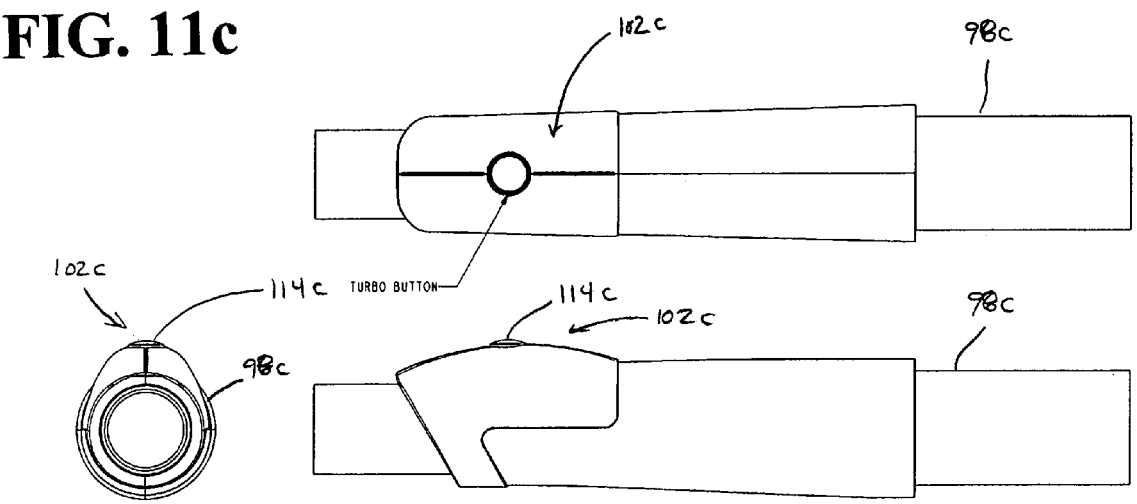
FIG. 11c are views of a portion of the hose and one construction remote control assembly.

FIG. 11c illustrates a portion of a hose 98c including a remote control 102c. In the illustrated construction, the remote control 102c controls a "turbo" function. The remote control 102c includes a turbo button 114c. The turbo button 114c communicates with the controller (not shown) of the vacuum cleaner 10 to operate the motor 38 at the appropriate speed to provide the appropriate power level in the selected operating mode.

The vacuum cleaner 10 may include a separate on/off switch (not shown). The switch may be positioned on the hose 96c in proximity to the turbo button 114c or may be positioned on the housing (not shown) of the vacuum cleaner 10.

In the illustrated construction, the vacuum cleaner 10 generally provides two power levels for the user. The first power level is a normal running mode, in which the vacuum cleaner 10 provides standard operating function and is operable to pick up most debris. The second mode is a selective "turbo" power mode, in which the vacuum cleaner 10 provides a generally higher power to pick up heavier objects.

In the illustrated construction, the turbo power mode provides for increased suction when required and is generally only active when the turbo button 114c is actuated by the user.

The turbo button 114c is actuated (e.g., depressed) by the user to select the higher power turbo power mode, and the user maintains the turbo button 114c in the actuated condition to operate the vacuum cleaner 10 in the turbo power mode. When the user releases the turbo button 114c, the vacuum cleaner 10 returns to the normal operating mode. In such a construction, the turbo button 114c is biased to the non-actuated position corresponding to the normal operating mode.

It should be understood that, in other constructions, the user may be required to deactuate the turbo button 114c and to de-select the turbo power mode, for example, by depressing the turbo button 114c a second time.

In the normal running mode, the vacuum cleaner 10 generally operates at a relatively lower power which provides an increased battery life and a decreased noise level. In the turbo power mode, the vacuum cleaner 10 provides increased power to pick up heavier objects. However, this increased power requires greater supply of power from the battery 14 and would tend to decrease battery life. This increased power also provides an increased noise level. By providing selective turbo power mode, the user can conveniently and effectively operate the vacuum cleaner 10 in two modes to provide an increased run time overall for the vacuum cleaner 10 while maintaining sufficient suction power and quiet noise performance during most operations.

Figure 11D:
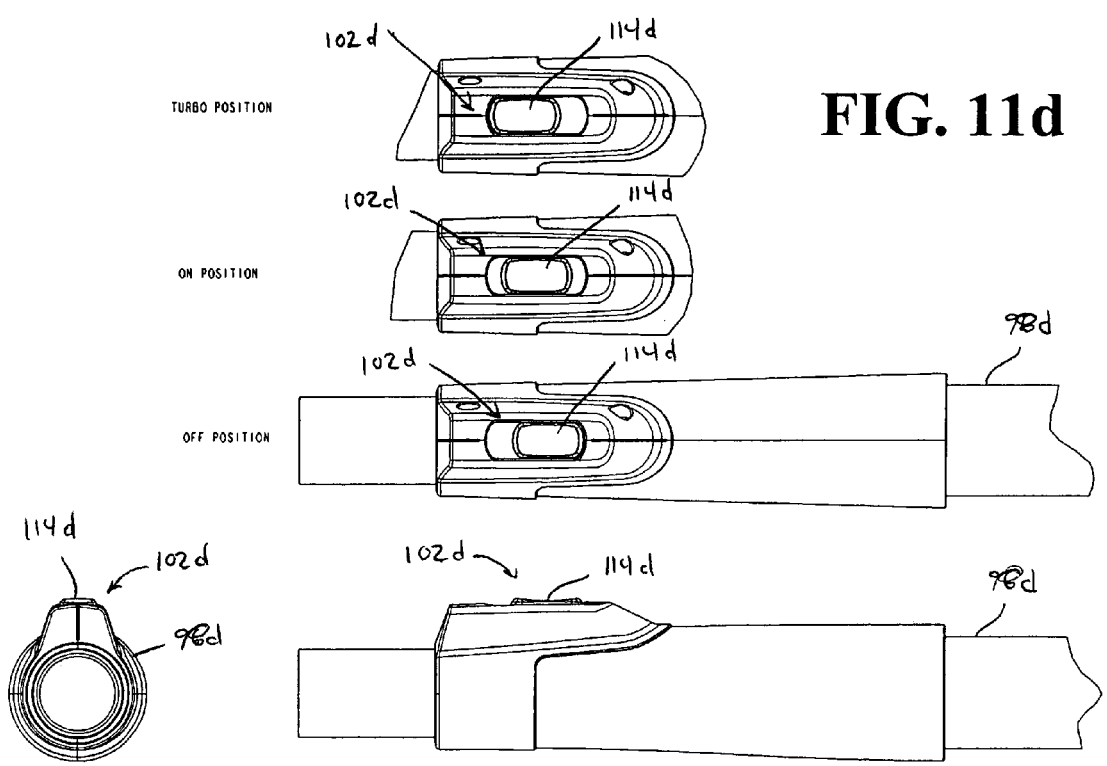
FIG. 11d are views of a portion of the hose and another construction of a remote control assembly.

FIG. 11d illustrates a portion of a hose 96d including a remote control 102d. The remote control 102d includes a three position button 114d which generally combines the functions of the on/off switch and the separate turbo button 114c illustrated in FIG. 11c. In the illustrated construction, the button 114d has an "off" position, in which the motor 38 is not operated, an "on" position, in which the motor 38 is operated in a normal running mode, and a "turbo" position, in which the motor 38 is operated in an increased turbo power mode. The turbo button 114d communicates with the controller (not shown) of the vacuum cleaner 10 to operate the motor 38 at the appropriate speed to provide the appropriate power level in the selected operating mode.

To operate the vacuum cleaner 10, the user actuates (e.g., slides) the button 114d to the "on" position. To operate the vacuum cleaner 10 in the turbo power mode, the user further actuates the button 114d to the "turbo" position. In the illustrated construction, the user is required to hold the button 114d in the "turbo" position to provide for momentary operation of the turbo mode. The button 114d is biased from the "turbo" position to the "on" position. When the user releases the button 114d from the "turbo" position, button 114d moves to the "on" position, and the vacuum cleaner 10 returns to the normal operating mode.

Structure may be provided to selectively hold the button 114d in one or more of the positions (e.g., the "off" position, the "on" position) so that the user is not required to hold the button 114d in such positions. In the illustrated construction, the button 114d is selectively held in the "on" position and in the "off" position.

In other constructions, the button 114d may be biased to the "off" position, and the user may be required to hold the button 114d in the other positions (e.g., the "on" position, the "turbo" position). In other constructions, the structure may also selectively hold the button 114d in the "turbo" position.

Increasing the run time of a DC-powered vacuum cleaner while still maintaining sufficient suction and quiet performance is a challenge due to the trade-offs that exist between these requirements. Because maximum suction power is not always required, providing the user with at least two suction power levels (e.g., a normal running mode and a selective turbo power mode to pick up heavier objects) will allow for increased battery life and a decreased noise level at standard operating modes. Having a turbo switch for this function, and an on/off function, at the end of the hose will allow the user to conveniently and effectively use the two functions. The two power levels will conserve battery life for the DC-powered vacuum cleaner and still provide the user with sufficient power when increased power is needed.

Two power modes may enable the size of the hose to be optimized to provide for most efficient suction power and for increased opening diameter for larger debris.

Figure 12:
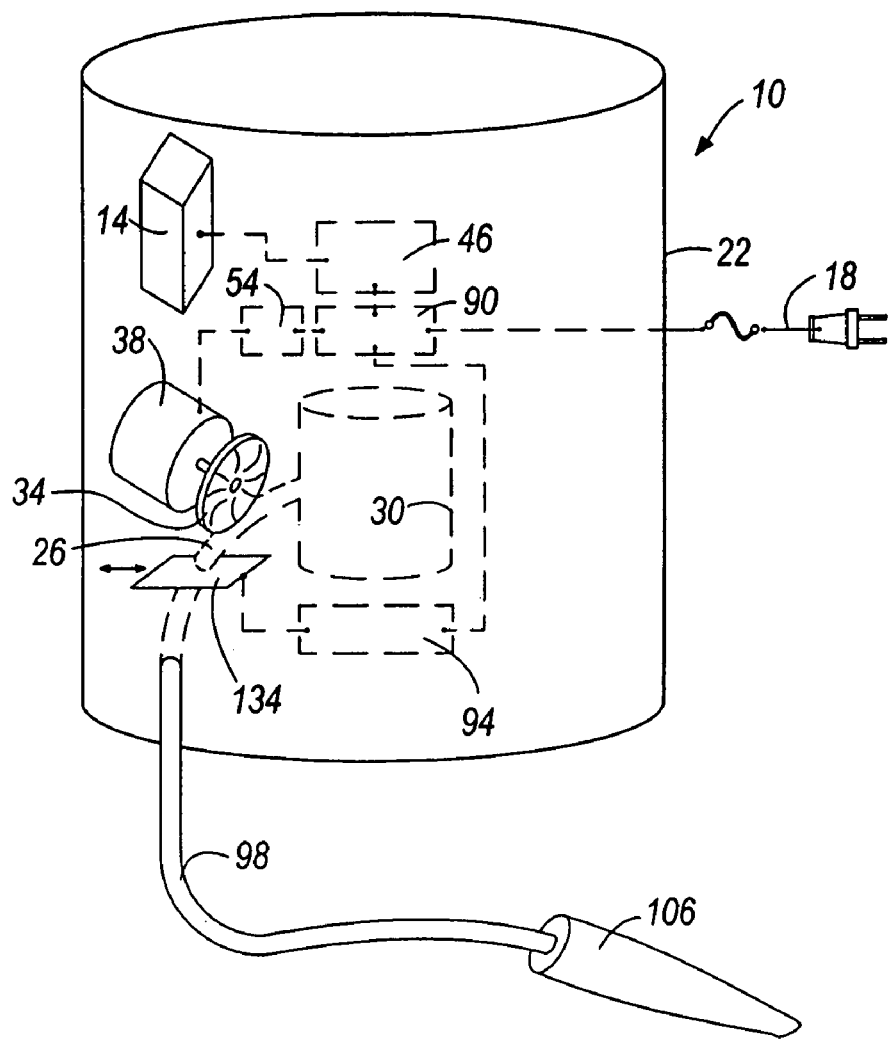
FIG. 12 is a schematic view of the vacuum cleaner of FIGS. 1, 2, and 4, illustrating a door positioned in a passageway defined in the housing.

FIG. 12 illustrates the vacuum cleaner 10 including a door 134 positioned in the passageway 26. The door 134 is movable between a blocking position, in which the airflow through the passageway 26 is at least partially blocked, and an unblocking position, in which unobstructed airflow may be allowed through the passageway 26. The door 134 may be operably connected to any of a number of conventional actuating mechanisms (not shown) that can move the door 134 between the blocking and unblocking positions.

The actuating mechanism is electrically connected with the controller 94, such that the controller 94 may send a signal to the actuating mechanism to move the door 134. The controller 94 is configured to maintain the door 134 in the blocking position until the motor 38 reaches a pre-determined speed after start-up. This allows the motor 38 to accelerate to its steady-state operating speed more quickly, since the fan 34 only has to initially evacuate the portion of the passageway 26 downstream from the fan 34 (i.e., between the door 134 and the fan 34). As a result, the amount of energy required to accelerate the fan 34 is decreased, and a large power draw from the one or more batteries 14 is decreased. Once the fan 34 reaches a pre-determined speed, which may or may not be its steady-state operating speed, the controller 94 may signal the actuating mechanism to move the door 134 to the unblocking position. In some aspects, the "waste gate" or door 134 thus provides power conservation by reducing the large power draw at start-up of the motor 38 and fan 34.

Figure 13A:
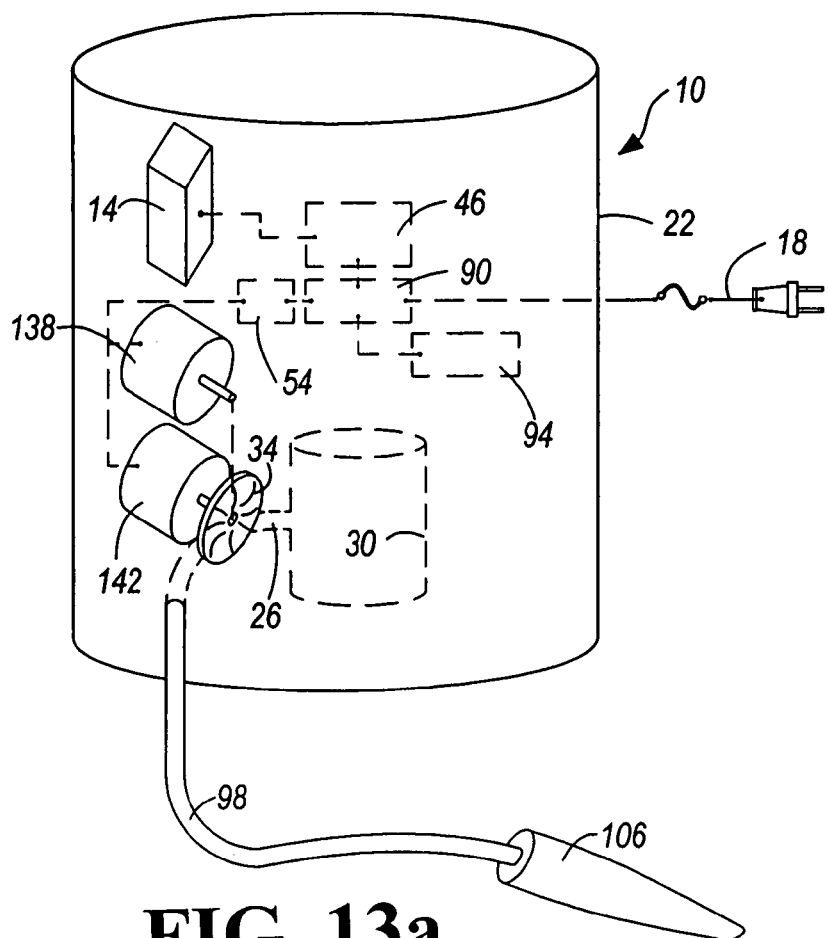
FIG. 13a is a schematic view of the vacuum cleaner of FIGS. 1, 2, and 4, illustrating a first motor and a second motor being supported by the housing.

FIG. 13a illustrates the vacuum cleaner 10 including two motors 138, 142 supported by the housing 22. The first motor 138 may operate using a first type of power source, such as an AC power source, and the separate second motor 142 may operate using another type of power source, such as a DC power source. As shown in FIG. 9, the controller 94 may be operable to switch between which of the first and second motors 138, 142 drives the fan 34. Any of a number of selective drive configurations between the first motor 138, the second motor 142, and the fan 34 may be used with the schematic shown in FIG. 13a.

The first motor 138, for example, may be used to drive the fan 34 when the electrical cord 18 is plugged into an electrical outlet to receive AC power. The second motor 142 may be used to drive the fan 34 when the electrical cord 18 is not plugged into an electrical outlet. Further, the second motor 142 may be sized to consume less energy than the first motor 138, thus extending the run time of the vacuum cleaner 10 when operating off of the batteries 14.

Figure 13B:
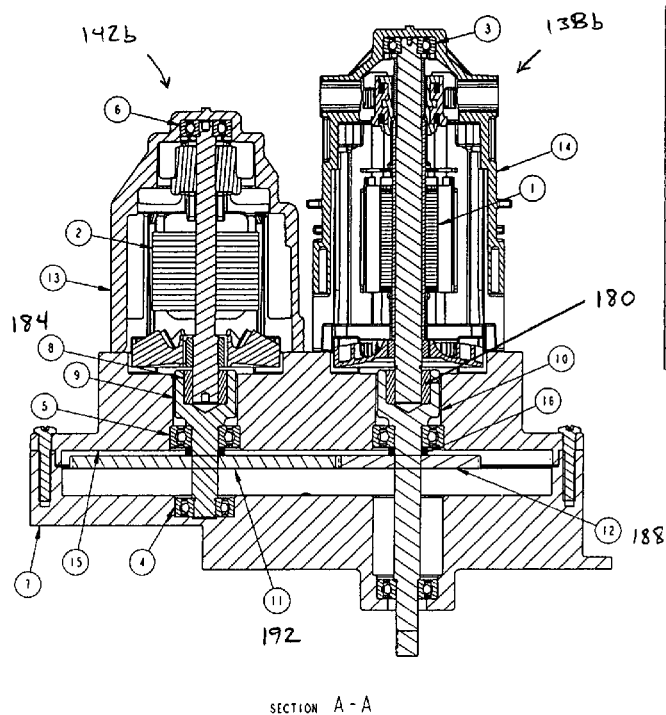
FIG. 13b is a cross-sectional view of a portion of a vacuum cleaner and illustrating a two-motor arrangement.
Figure 13C:
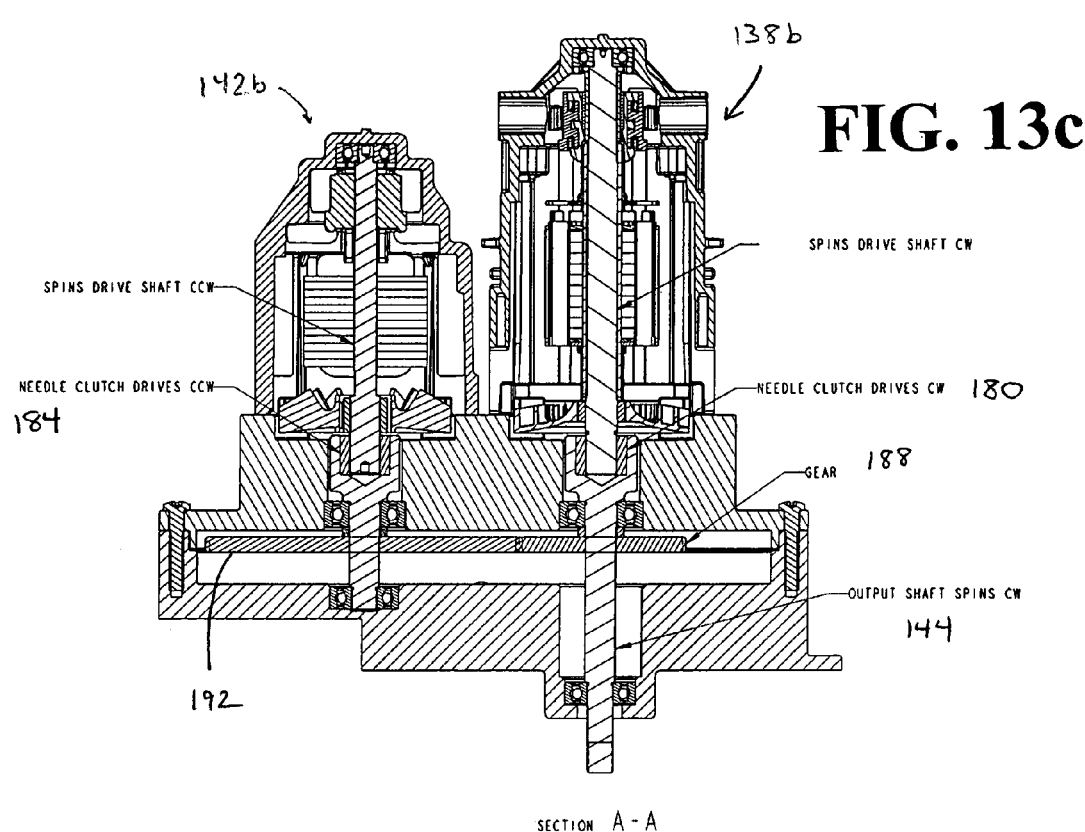
FIG. 13c is another cross-sectional view of a portion of a vacuum cleaner and illustrating a two-motor arrangement.

FIGS. 13b and 13c illustrate a vacuum cleaner 10 including two motors 138b, 142b supported by the housing 22b. In the illustrated construction, the first motor 138b operates using a first type of power source (e.g., an AC power source), and the separate second motor 142b operates using another type of power source (e.g., a DC power source). As described above, a controller (not shown) may be operable to switch between the motor 138b or 142b which drives the output shaft 144 to which the fan (not shown) of the vacuum cleaner 10 is connected.

In the illustrated construction, the vacuum cleaner 10b includes a selective drive arrangement between the motors 138b, 142b and the drive shaft 144. In the illustrated construction, the drive arrangement includes a first clutch 180, such as, for example, a needle clutch, in selective driving arrangement between the first motor 138b and the drive shaft 144 and a second clutch 184, such as, for example, a needle clutch, in selective driving arrangement between the second motor 142b and the drive shaft 144.

A gear arrangement may be provided between the second motor 142b and the drive shaft 144. The gear arrangement includes a first gear 188 supported on the drive shaft 144 and a second gear 192 driven by the second motor 142b and engageable with the first gear 188.

When the vacuum cleaner 10 is powered by an AC power source, the motor 138b directly drives the drive shaft 144. When the vacuum cleaner 10 is operated by a DC power source, the second motor 142b will drive the drive shaft 144 through the gear assembly. The drive arrangement including the clutches 180 and 184 allows operation of either the AC motor 138b or the DC motor 142b to drive the drive shaft 144.

It should be understood that, in other constructions (not shown), the motors 138b, 142b, may be arranged in a different manner to drive the drive shaft 144. For example, the motors 138b, 142b may be in-line rather than being offset. Also, it should be understood that, in other constructions (not shown) a different drive arrangement may be provided to enable the motors 138b, 142b to selectively drive the drive shaft 144.

Figure 14A:
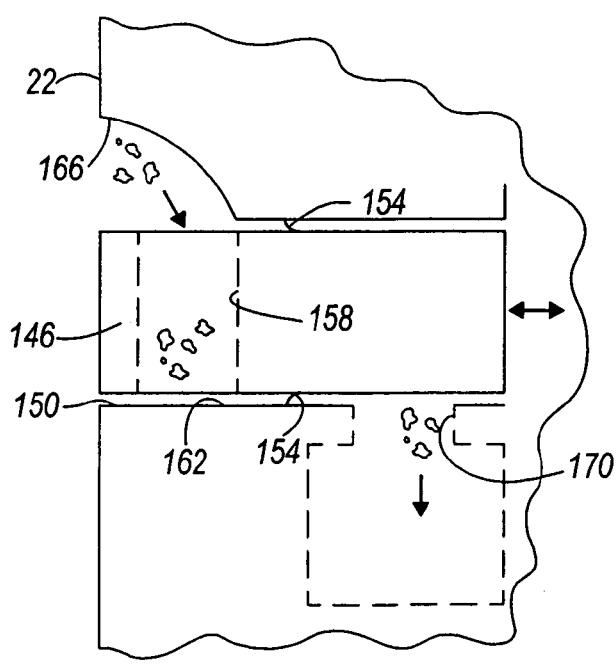
FIG. 14a is a schematic view of a portion of the vacuum cleaner of FIGS. 1, 2, and 4, illustrating one construction of debris receptacle or debris tray for transporting debris outside the housing to inside the debris chamber.

FIG. 14a illustrates a "chunk dump" or debris tray 146 allows the user to deposit large pieces of debris, which are too large to be easily picked up (or to be picked up at all) with the hose 98, directly into the debris chamber 30 without having to turn off the motor 38. The debris tray 146 is slidably extendable from the housing 22. The debris tray 146 is slidable within an opening 150 in the housing 22, which is sized to provide a snug fit with the debris tray 146. Conventional lip seals 154 may be used to prevent the compressed airflow generated by the fan 34 from escaping through the gap between the opening 150 and the debris tray 146.

The debris tray 146 includes an aperture 158 therethrough, into which the large debris may be inserted. In combination with a bottom surface 162 of the opening 150, the aperture 158 forms a cup in which to receive the large debris. The housing 22 may also include a recess 166 to allow easy access to the debris tray 146. Once the large debris is inserted into the aperture 158, the debris tray 146 may be slidably moved toward a depositing position, in which the aperture 158 encounters a hole 170 in the bottom surface 162 of the opening 150 to allow the debris to enter into the debris chamber 30 (by falling, under the force of the vacuum, etc.). The debris tray 146 may subsequently be returned to the extended position, in which the aperture 158 is accessible from outside of the housing 22 for the user to insert more debris therein.

Figure 14B:
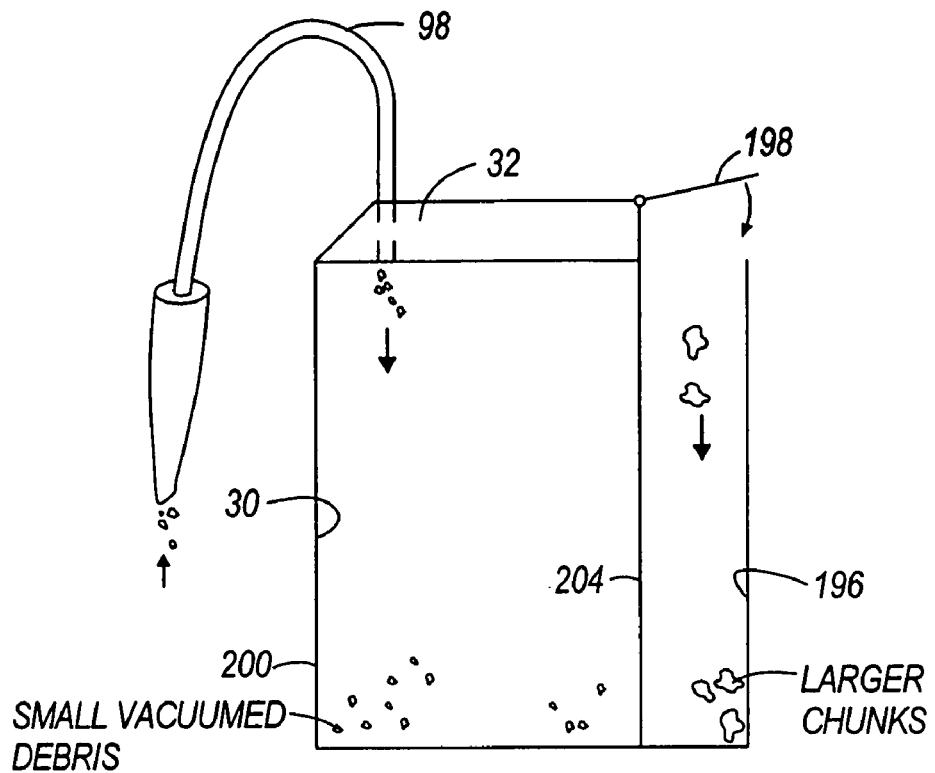
FIG. 14b is a schematic view of a portion of a vacuum cleaner and illustrating another construction of a debris receptacle.

FIG. 14b illustrates another construction of a "chunk-dump" or debris bin 196 which allows the user to deposit large pieces of debris which are too large to be easily picked up (or to be picked up at all) with the hose 98, without having to turn off the motor 38. In the illustrated construction, the debris bin 196 is provided separately from the debris chamber 30 in the housing 22. In the illustrated construction, the housing 22 includes a tank 200 providing the debris chamber 30, into which debris is provided by suction by the fan 34, and the debris bin 196, into which debris may be deposited through a door 198. The debris bin 196 is separated from the debris chamber 30 by a wall 204 and is sealed from the debris chamber 30. The debris bin 196 is generally not required to be sealed from the ambient surroundings of the housing 22 because the debris chamber 30 is sealed.

During operation, the user may pick up debris using the hose 98, and that vacuumed debris is deposited in the debris chamber 30 under the suction of the fan 34. At the same time, and without affecting operation of the vacuum cleaner 10, the user may deposit debris through the door 198 into the debris bin 196. After operation of the vacuum cleaner 10, the user may remove the cover 32 and empty debris from the debris chamber 30 and from the debris bin 196 at the same time.

In other constructions (not shown), a debris receptacle may be provided on the housing 22 and in which large debris may be held until the user has completed operation of the vacuum cleaner.

Dispersement of exhaust air in one location from the housing 22 enables the vacuum cleaner 10 to have a blower mode. However, confined air exhaust increases the noise level of the vacuum cleaner, and high velocity of the air exhaust may stir up debris in the work area.

Figure 15:
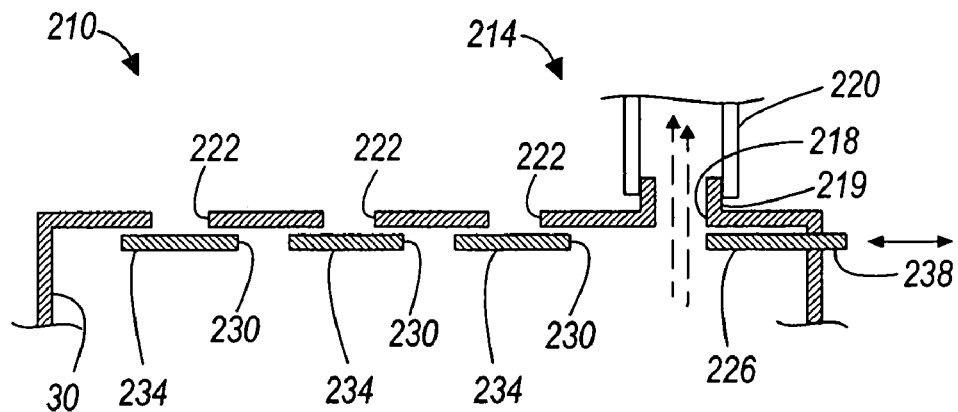
FIG. 15 is a cross-sectional view of a portion of a vacuum cleaner and illustrating an exhaust air outlet arrangement.

FIG. 15 illustrates an exhaust air outlet arrangement 210 for a vacuum cleaner 10 in which the vacuum cleaner 10 may provide two modes for air dispersement—a dispersed air mode, in which the velocity of exhaust air is decreased and a generally quieter operation is provided, and a blower mode. The vacuum cleaner 10 may include structure for modifying the exhaust outlet 214 of the vacuum cleaner 10 to provide for a confined air exhaust for a blower mode and a dispersed air exhaust for a dispersed air mode.

In the illustrated construction, the exhaust outlet 214 includes a first exhaust opening 218 and one or more second exhaust opening(s) 222. A connector 219 is provided proximate to the first exhaust opening 218, and a blower attachment 220 (partially illustrated) is connectable to the connector 219 so that blower air may be provided through the blower attachment 220 to a location.

A selective blocking member 226 is movable (e.g., slidable, pivotable, rotatable, etc.) relative to the exhaust outlet 214 to selectively cover and uncover one or more of the second exhaust openings 222. The member 226 includes opening(s) 230 and blocking portion(s) 234 which are selectively alignable with the second exhaust opening(s) 222 to uncover and cover, respectively, the second exhaust opening (s) 222. An actuator 238 is provided to adjust the mode of air dispersement, for example, by moving the member 226.

The member 226 is movable between a first or blower mode position (shown in FIG. 15) in which at least some of the second exhaust openings 222 are covered and blocked by the blocking portions 234 to restrict or prevent air flow through the second exhaust openings 222, and a second or dispersed air mode position, in which at least some of the second exhaust opening(s) 222 are uncovered and aligned with the opening(s) 230 to allow at least some air flow through the second exhaust openings 222. In the blower mode position, exhaust air flow through the exhaust outlet 214 is restricted and provided at least in most part through the first exhaust opening 218. In the dispersed air mode, exhaust air flow is relatively less restricted, and exhaust air is allowed to flow at least partially through one or more of the second exhaust openings 222.

In other constructions, the vacuum cleaner 10 may include structure to provide increased power so that the vacuum cleaner 10 may be used in a blower mode. Such structure may be similar to the "turbo" structure described above.

To reduce the noise caused by the vacuum cleaner 10, the vacuum cleaner 10 may include a muffler arrangement which may be installed on the exhaust outlet 214. The muffler arrangement may be removable or adjustable so that the exhaust outlet 214 is usable in a blower mode.

Figure 16:
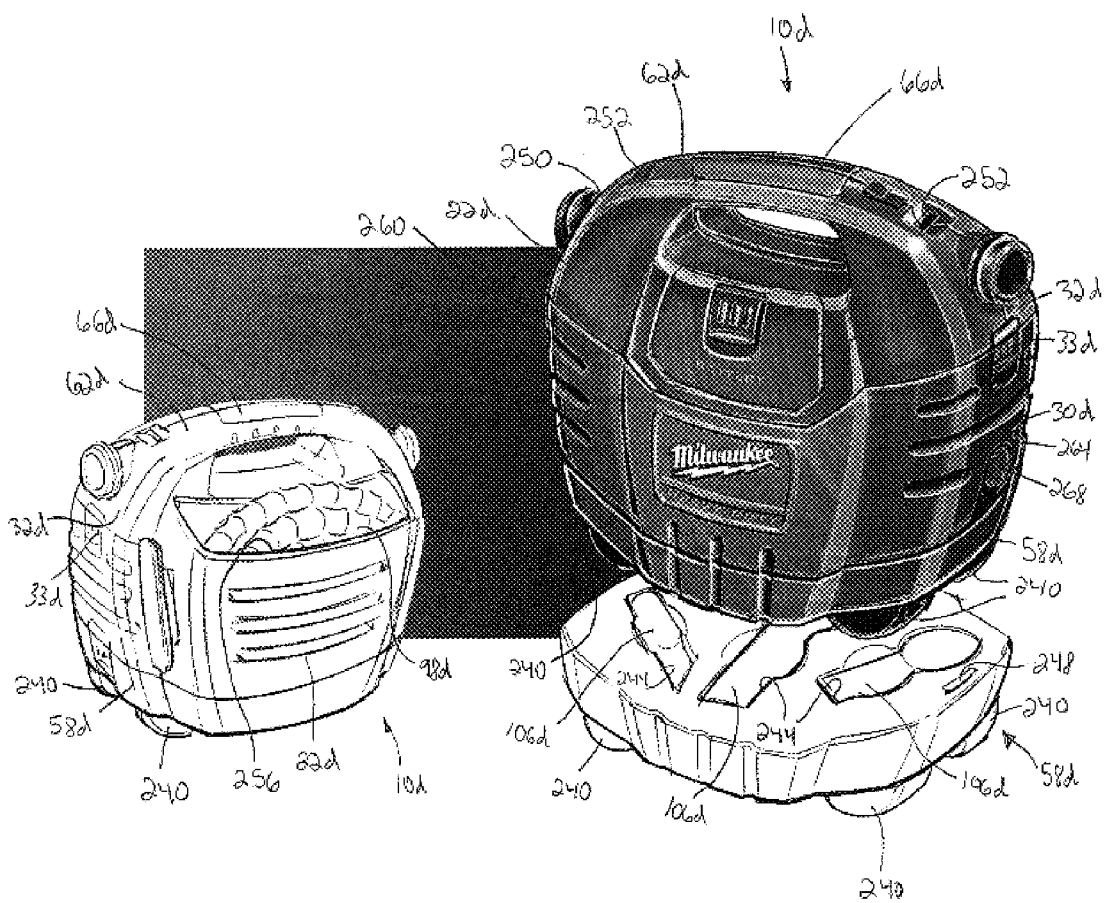
FIG. 16 is front and rear perspective views of another construction of a vacuum cleaner.

An alternative construction of vacuum cleaner 10d is illustrated in FIG. 16. Reference is made to the above discussion regarding the structure, operation, and alternatives of the vacuum cleaner 10 illustrated in FIGS. 1-15. Common elements are identified by the same reference numbers "d".

The vacuum cleaner 10d includes a plurality of wheels or rollers 240 connected to a bottom of the base 58d to facilitate rolling movement of the vacuum cleaner 10d along a ground surface of a working environment. In the illustrated construction the vacuum cleaner 10d includes four rollers 240, however, the vacuum cleaner 10d can include any number of rollers thereon to facilitate rolling movement of the vacuum cleaner 10d. In some constructions, the rollers 240 are castors. In other constructions, the rollers 240 are wheels having tread or some other type of resilient gripping surface to provide grip between the wheels and the ground surface.

With continued reference to FIG. 16, the base 58d is selectively detachable from the housing 22d and includes a plurality of accessory receptacles 244 defined in a top surface thereof for receiving a plurality of vacuum accessories 106d. In the illustrated construction, the base 58d and housing 22d are selectively connected by a pressure-fit projection and groove connection 248. In such a connection, the base 58d is detached from the housing 22d by applying sufficient force in opposite directions upon the housing 22d and the base 59d. Similarly, the housing 22d and the base 58d is re-connected by aligning the projection and groove and applying sufficient force toward one another to snap or pressure-fit the projection within the groove. In some constructions, a latch similar to the latch 33d may be used to selectively connect the housing 22d to the base 58d.

A receptacle 249 is defined in the housing 22d for receiving a battery 14 and a cover 250 is attached to the housing 22d to close and secure the battery within the receptacle. The receptacle for receiving a battery is described in more detail in the '107 Application.

A pair of strap anchors 252 are defined in the housing 22d for receiving ends of a shoulder strap (not shown) to allow a user to support the vacuum cleaner 10d on their shoulder and carry the vacuum cleaner around the working environment on their shoulder rather than by the handle 62d. The vacuum cleaner 10d also defines a hose storage bin 256 on a rear of the vacuum cleaner 10d. The bin 256 is properly sized to contain the hose when coiled.

With further reference to FIG. 16, the vacuum cleaner 10d includes wet and dry vacuuming capabilities. The vacuum cleaner 10d includes a wet/dry switch (not shown) manipulatable by a user to select the function of the vacuum cleaner 10d and the debris container 30d includes a dry portion 260 for containing debris collected during dry vacuuming operation and a wet portion 264 for containing debris collect during wet vacuuming operation.

To dispose of the debris located in the dry portion 260 of the debris container 30d, the latches 33d are released to allow separation of the upper portion of the housing 22d from the debris container 30d. The debris container 30d is then dumped to remove the debris from the dry portion 264. Debris located in the wet portion 264 of the debris container 30d can be removed in two manners. Firstly, the latches 33d can be released to allow separation of the upper portion of the housing 22d from the debris container 30d and the debris container 30d can be dumped to remove the debris in the wet portion 264. Secondly, the debris can be removed from the wet portion 264 without separating the upper portion of the housing 22d from the debris container 30d. A plug 268 is positioned in an aperture defined in a side wall of the wet portion 264 of the debris container 30d and is removable by a user to allow the debris to flow or be poured through the aperture. After the debris has sufficiently been vacated from the wet portion 264, the plug is replaced and operation of the vacuum cleaner 10d can continue.

Figure 17:
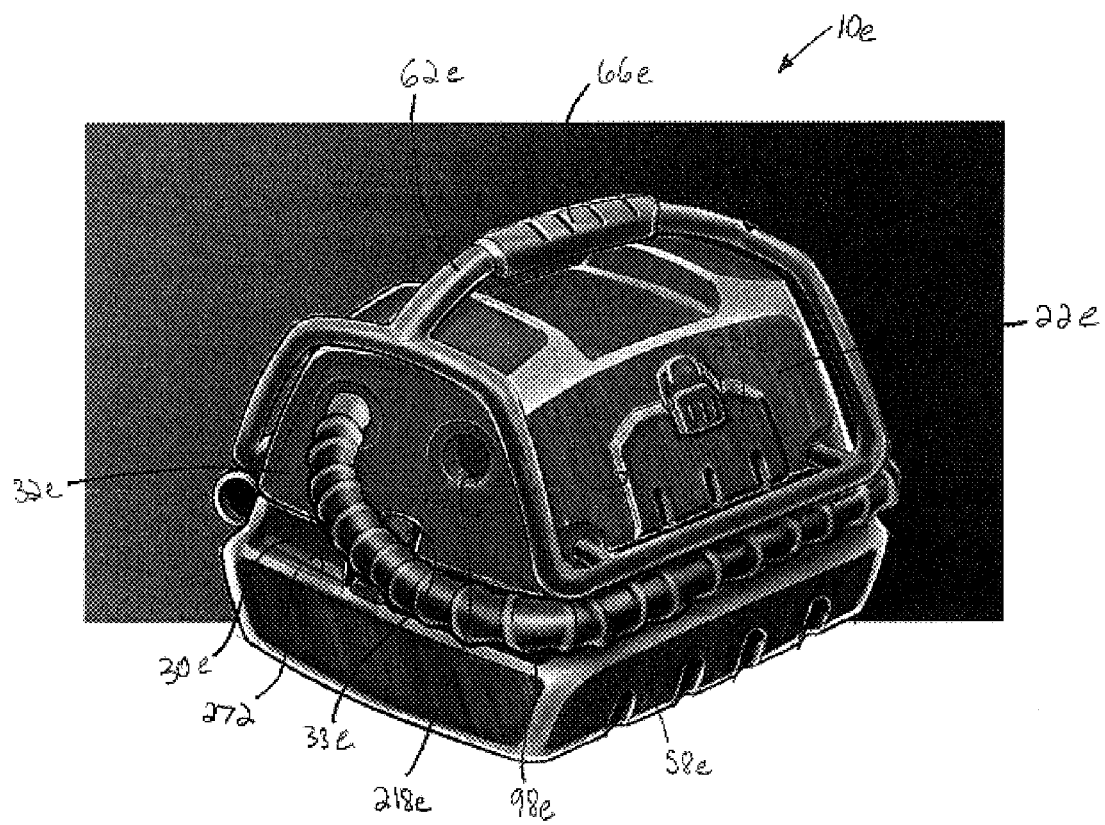
FIG. 17 is a front perspective view of another construction of a vacuum cleaner.

An alternative construction of vacuum cleaner 10e is illustrated in FIG. 17. Reference is made to the above discussion regarding the structure, operation, and alternatives of the vacuum cleaner 10 illustrated in FIGS. 1-16. Common elements are identified by the same reference numbers "e".

The handle 62e is configured to extend beyond exterior surfaces of the housing 22e to provide protection to the housing 22e from impacts. The handle 62e configuration is described in more detail in the '234 Application.

With continued reference to FIG. 17, the base defines a hose wrapping channel 272 for receiving the hose 98e when it is wrapped around the vacuum cleaner 10e for storage purposes. In some constructions, the hose 98e is press-fit within the channel to ensure that the hose 98e does not undesirably fall out of the channel 272. In other constructions, a clip (not shown) can be supported by the housing 22e or the base 58e and positioned in or near the channel 272 for receiving a portion of the hose in a press-fit or snap-fit manner to secure the hose 98e to the vacuum cleaner 10e.

In the illustrated construction, the handle 62e and channel 272 are configured to provide protection to the hose 98e when the hose 98e is wrapped around the vacuum cleaner 10e within the channel 272. The handle 62e extends beyond the hose 98e to provide protection from impacts.

Figure 18:
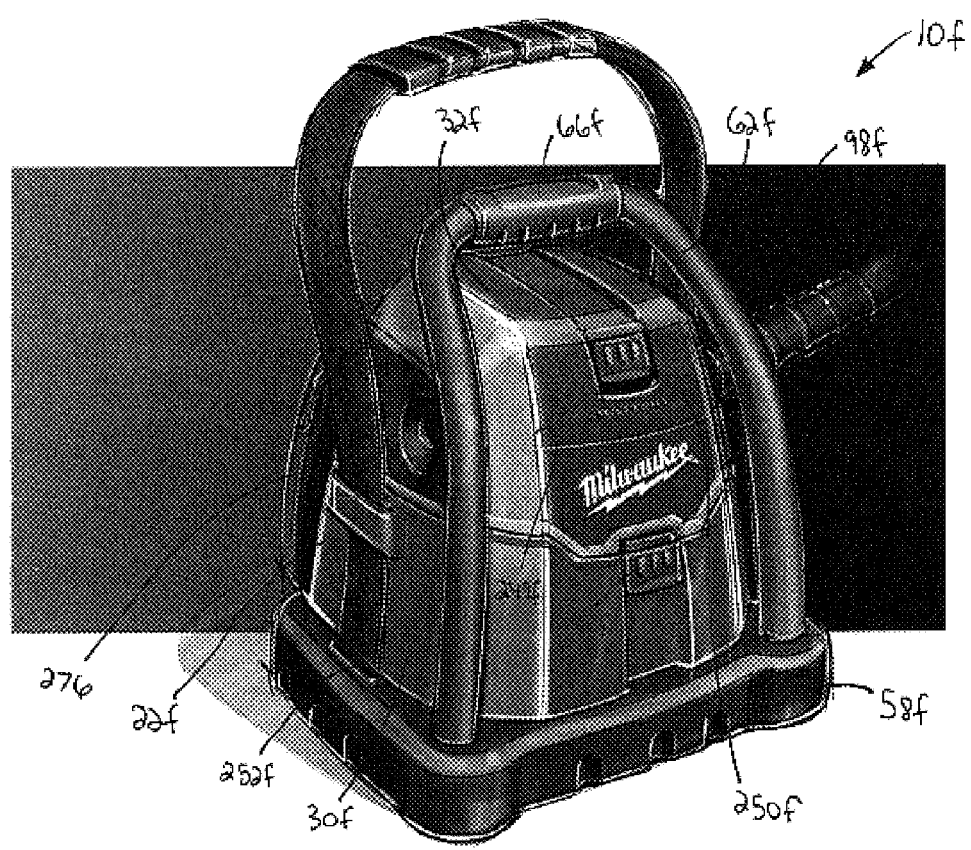
FIG. 18 is a front perspective view of another construction of a vacuum cleaner.

An alternative construction of vacuum cleaner 10f is illustrated in FIG. 18. Reference is made to the above discussion regarding the structure, operation, and alternatives of the vacuum cleaner 10 illustrated in FIGS. 1-17. Common elements are identified by the same reference numbers "f".

The vacuum cleaner 10f includes an accessory bag 276 connected to the rear of the vacuum cleaner for receiving the hose 98f, vacuuming accessories or other items, such as, for example a CD player, telephone, power tool batteries, and jobsite tools. The accessory bag 276 is described in more detail in the '107 Application.

In some constructions of the vacuum cleaner 10f, the cover 32f can be removed by releasing latch 33f and pivoting the cover rearward to expose the interior of the vacuum cleaner 10f and the debris container 30f. The handle 62f is configured to allow the cover to pivot rearward without interference. In other constructions of the vacuum cleaner 10f, the handle 62f can be removed from the base 58f to allow the cover 32f to be removed. In yet other constructions of the vacuum cleaner 10f, the handle 62f can be pivoted forward to move out of the path of the cover 32f and allow removal of the cover 32f.

Figure 19:
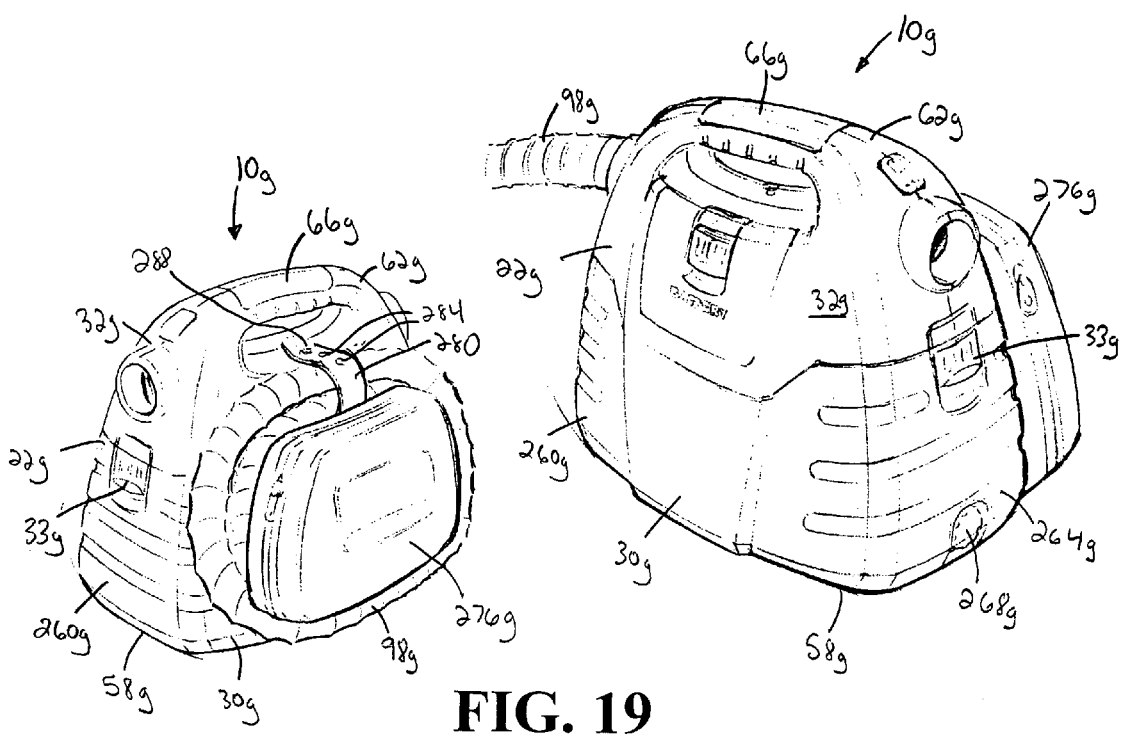
FIG. 19 is front and rear perspective views of another construction of a vacuum cleaner.

An alternative construction of vacuum cleaner 10g is illustrated in FIG. 19. Reference is made to the above discussion regarding the structure, operation, and alternatives of the vacuum cleaner 10 illustrated in FIGS. 1-18. Common elements are identified by the same reference numbers "g".

The vacuum cleaner 10g includes a hose wrapping projection (hidden behind accessory bag 276g) around which the hose 98g is wrapped for storage. The vacuum cleaner 10g also includes a securing strap 280 having one end connected to the hose wrapping projection and having a plurality of apertures 284 defined in the other end of the strap 280. The strap 280 wraps around the coiled hose and one of the apertures 284 is slipped over a securement projection 288 on the housing 22d to secure the hose 98g to the housing 22g. The accessory bag 276g is connected to the hose wrapping projection.

Figure 20:
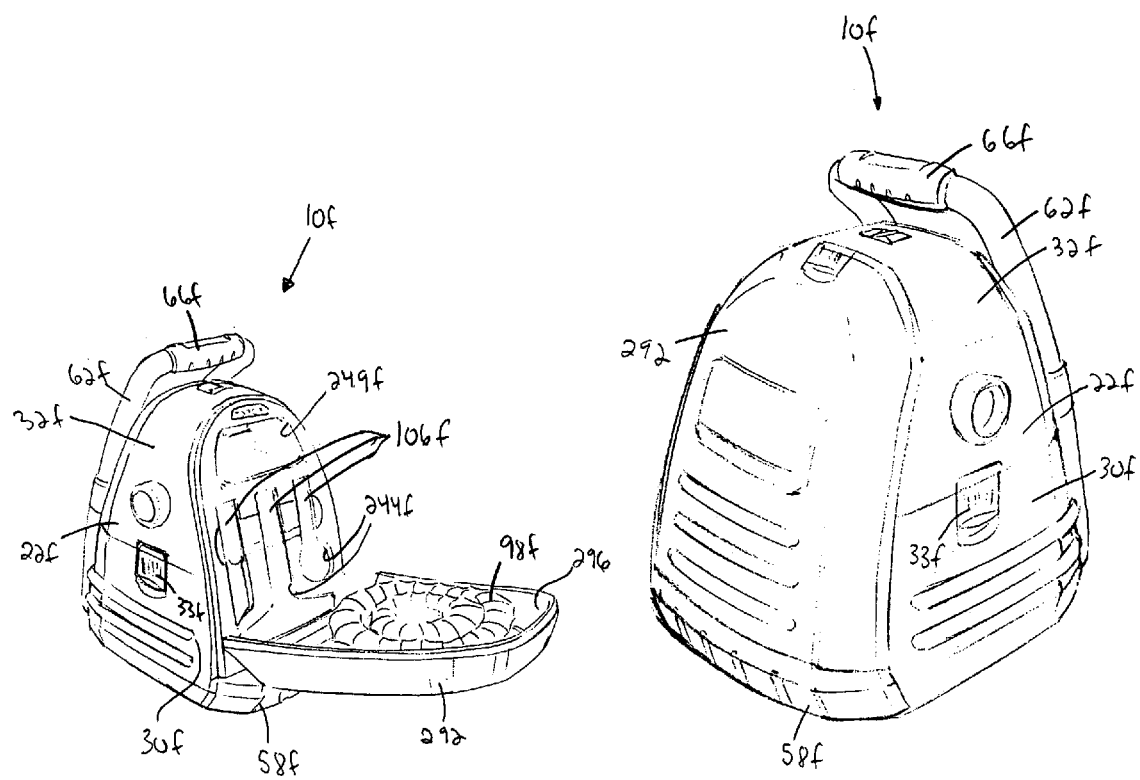
FIG. 20 is a pair of rear perspective views of another construction of a vacuum cleaner, one of the rear perspective views shown with a storage door in an open position.
Figure 21:
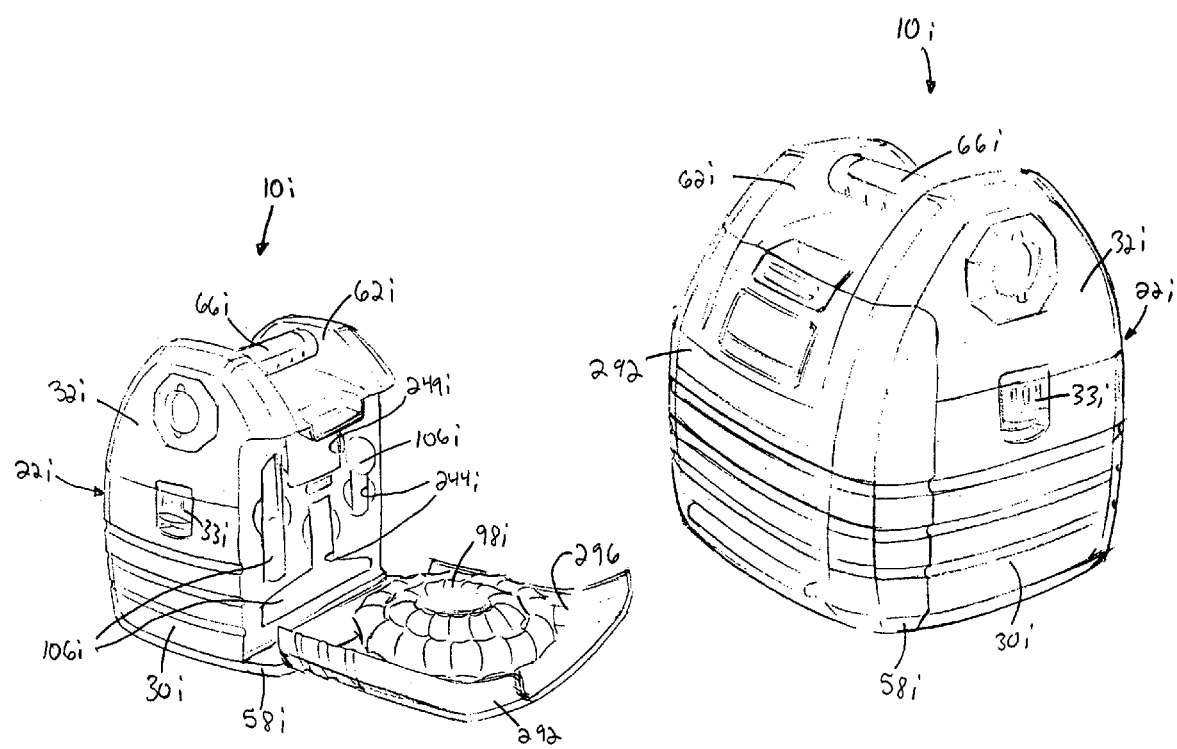
FIG. 21 is a pair of rear perspective views of another construction of a vacuum cleaner, one of the rear perspective views shown with a storage door in an open position.

Alternative constructions of vacuum cleaners 10h and 10I are illustrated in FIGS. 20 and 21. Reference is made to the above discussion regarding the structure, operation, and alternatives of the vacuum cleaner 10 illustrated in FIGS. 1-19. Common elements are identified by the same reference numbers "f" and "i", respectively.

The vacuum cleaner 10f, 10i includes a storage door 292 pivotal between an open position (shown in the left perspective view) and a closed position (shown in the right perspective view). A latch similar to the latch 33f, 33i is disposed at the top of the door 292 to secure the door 292 to the housing 22f, 22i in the closed position. Releasing the latch allows the door 292 to pivot to the open position. In the open position, the receptacle 249f, 249i is exposed to allow insertion and removal of batteries and a plurality of accessory receptacles 244f, 244i are exposed to allow insertion and removal of vacuum accessories 106f from the accessory receptacles 244f, 244i. In addition, the door 292 defines a hose well 296 in a rear thereof for storing the hose 98f, 98i when not in use.

Figure 22:
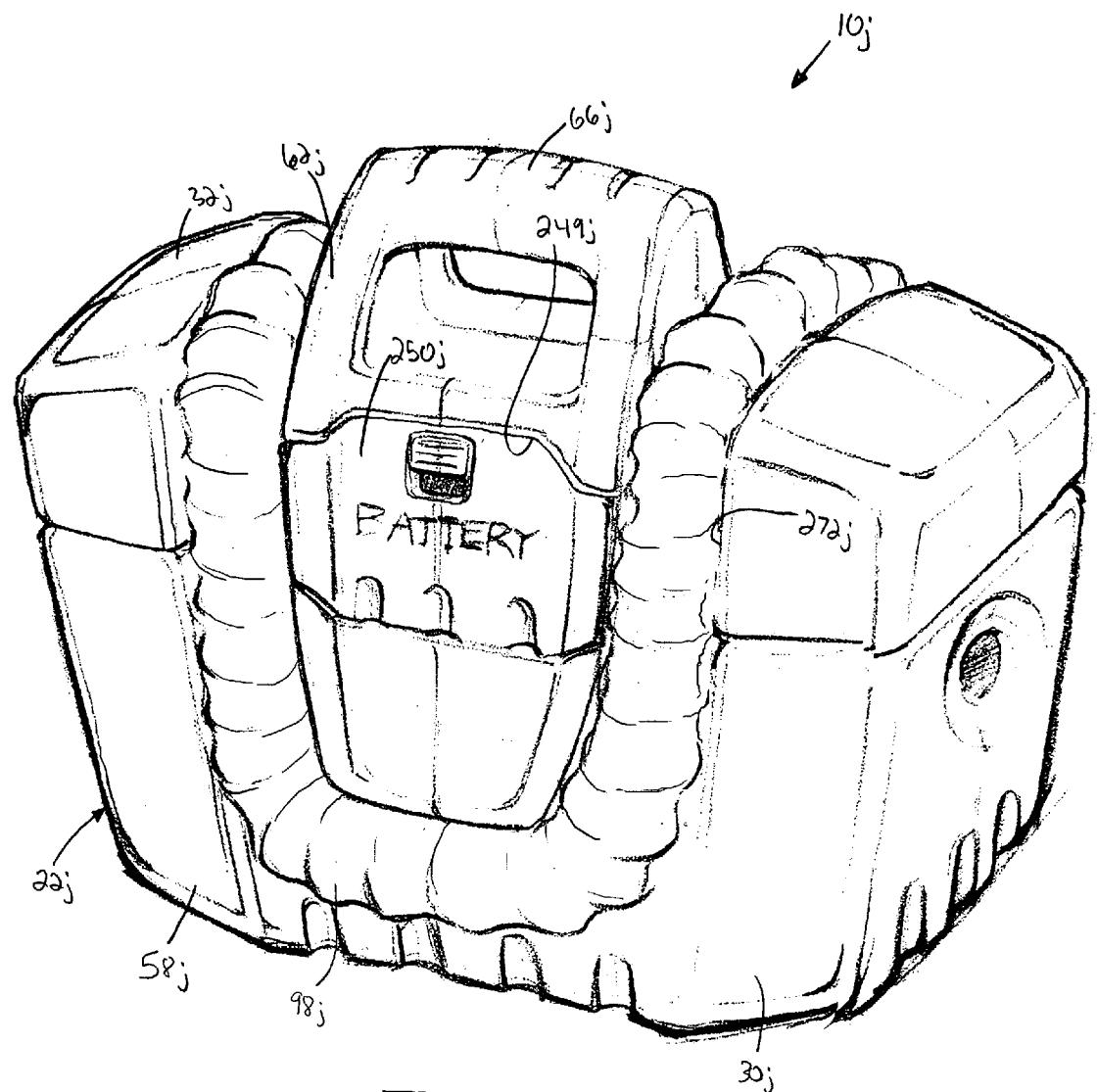
FIG. 22 is a front perspective view of another construction of a vacuum cleaner.
Figure 23:
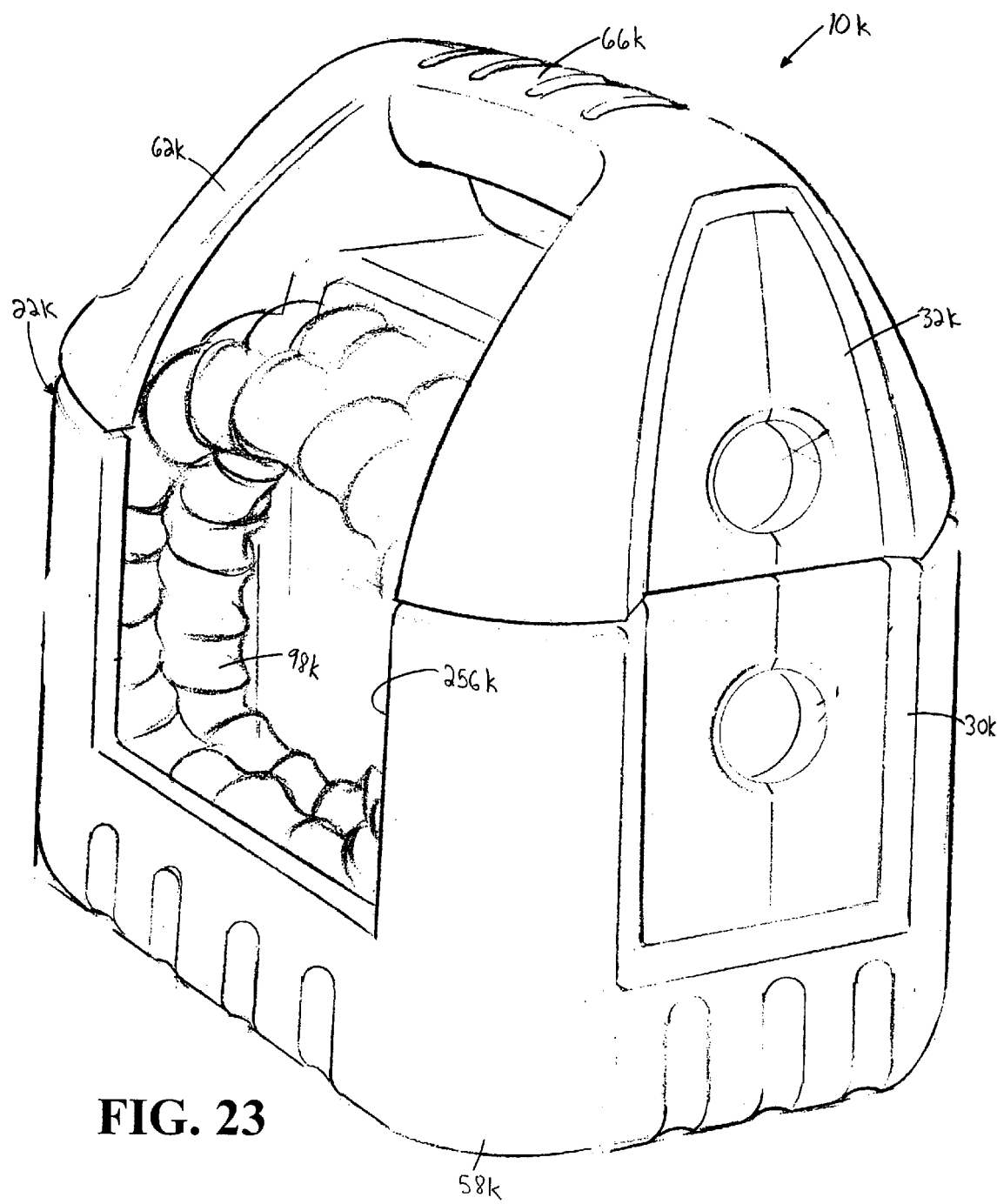
FIG. 23 is a rear perspective view of another construction of a vacuum cleaner.

Alternative constructions of vacuum cleaners 10j and 10k are illustrated in FIGS. 22 and 23. Reference is made to the above discussion regarding the structure, operation, and alternatives of the vacuum cleaner 10 illustrated in FIGS. 1-21. Common elements are identified by the same reference numbers "j" and "k".

Figure 24:
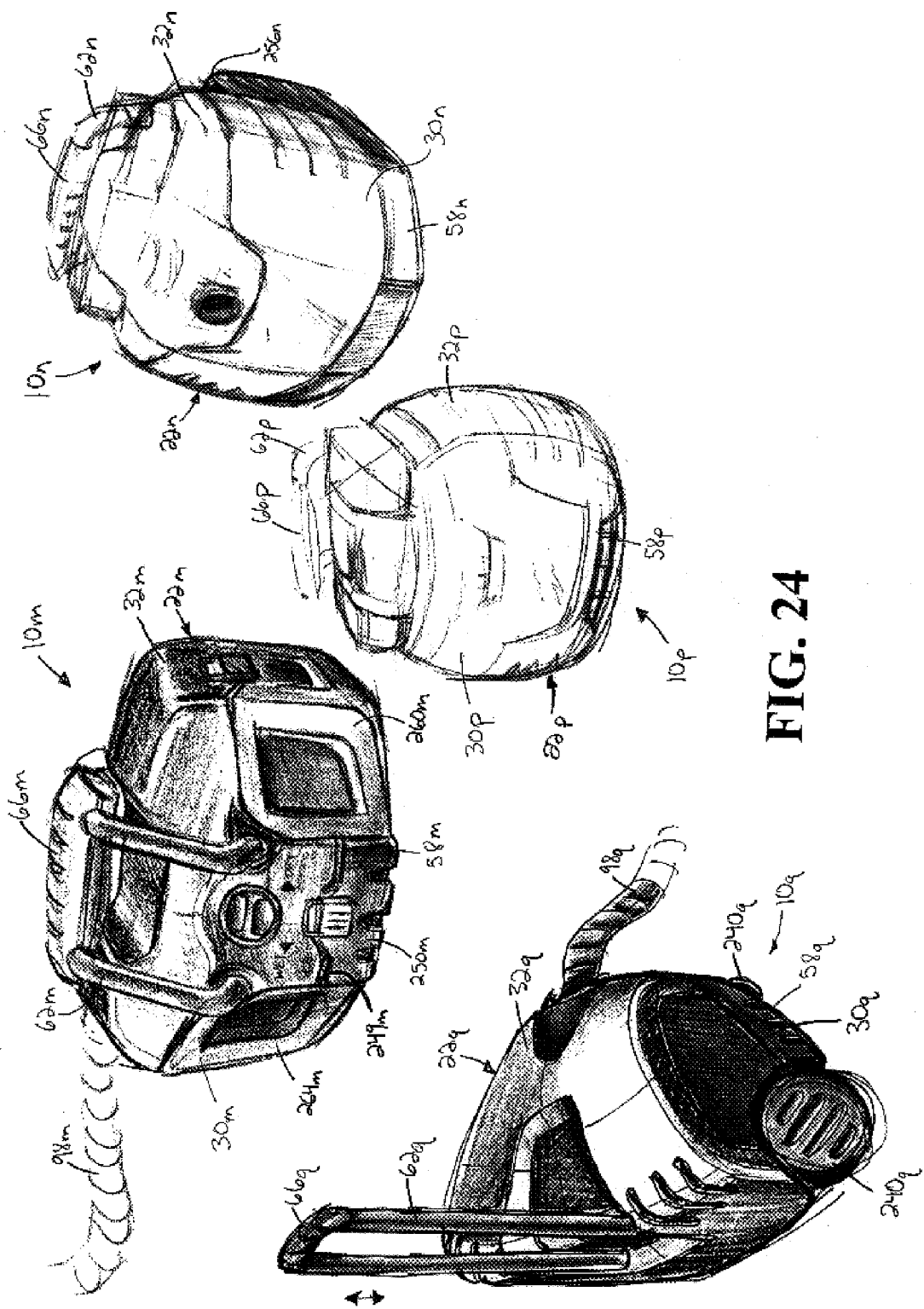
FIG. 24 is a plurality of perspective views of other constructions of a vacuum cleaner.

Alternative constructions of vacuum cleaners 10m, 10n, 10p and 10q are illustrated in FIG. 24. Reference is made to the above discussion regarding the structure, operation, and alternatives of the vacuum cleaner 10 illustrated in FIGS. 1-23. Common elements are identified by the same reference numbers "m", "n", "p" and "q", respectively.

The vacuum cleaner 10q includes a handle 62q that is moveable between a retracted position (not shown) and an extended position (illustrated). In the extended position, a user can grasp the handle 62q and pull the vacuum cleaner 10q behind them on the rollers 240q. The handle 62q can be moved to the retracted position for storage purposes when the vacuum cleaner 10q is located in a desired location or when other means of moving the vacuum cleaner 10q are desired. In the illustrated embodiment, the handle 62q slides between the retracted position and the extended position, however, the handle 62q can be moved between the retracted position and the extended position in a variety of manners and still be within the spirit and scope of the present invention.

Figure 25:
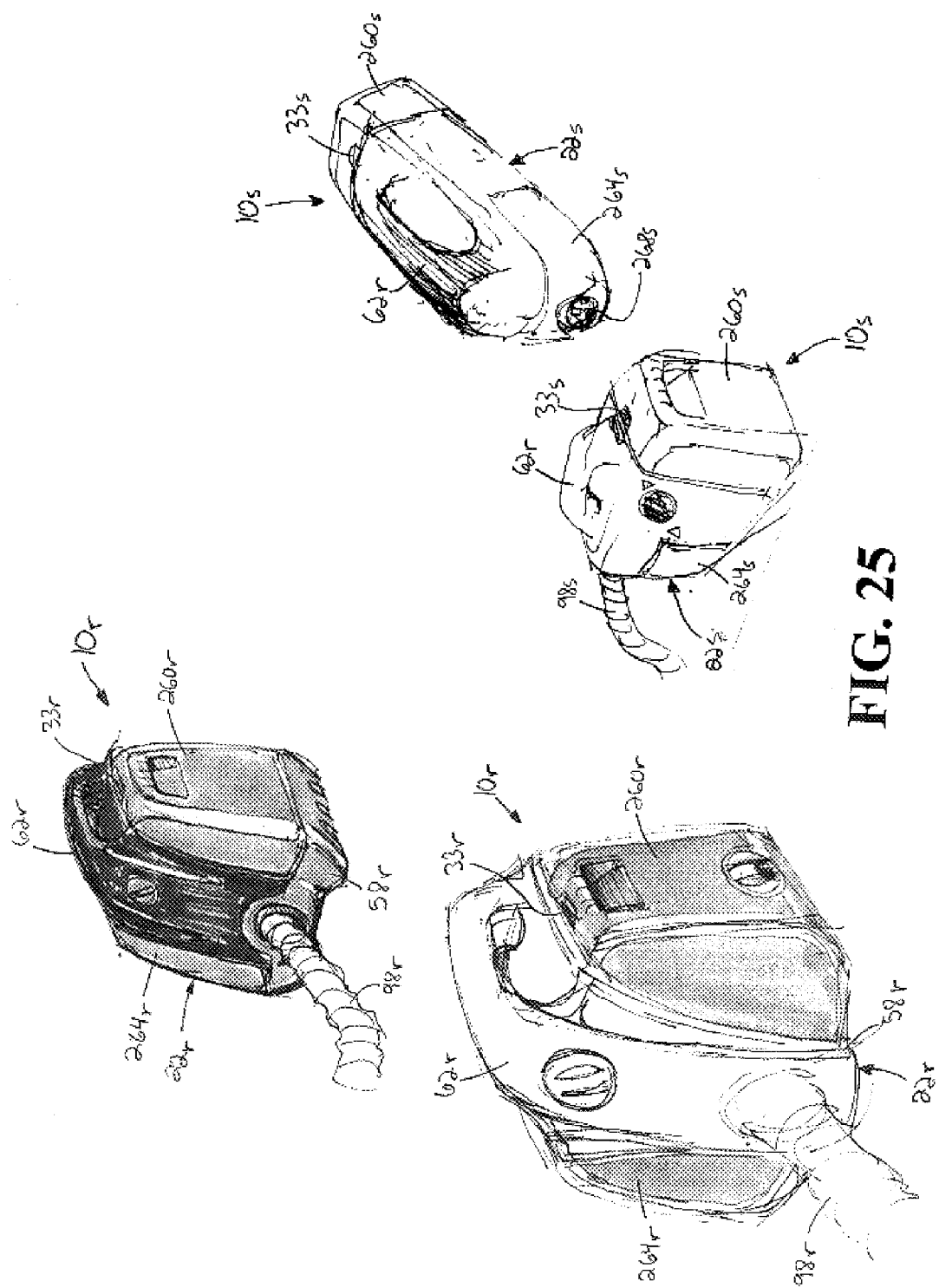
FIG. 25 is a plurality of perspective views of other constructions of a vacuum cleaner.

Alternative constructions of vacuum cleaners 10r and 10s are illustrated in FIG. 25. Reference is made to the above discussion regarding the structure, operation, and alternatives of the vacuum cleaner 10 illustrated in FIGS. 1-24. Common elements are identified by the same reference numbers "r" and "s", respectively.

Figure 26:
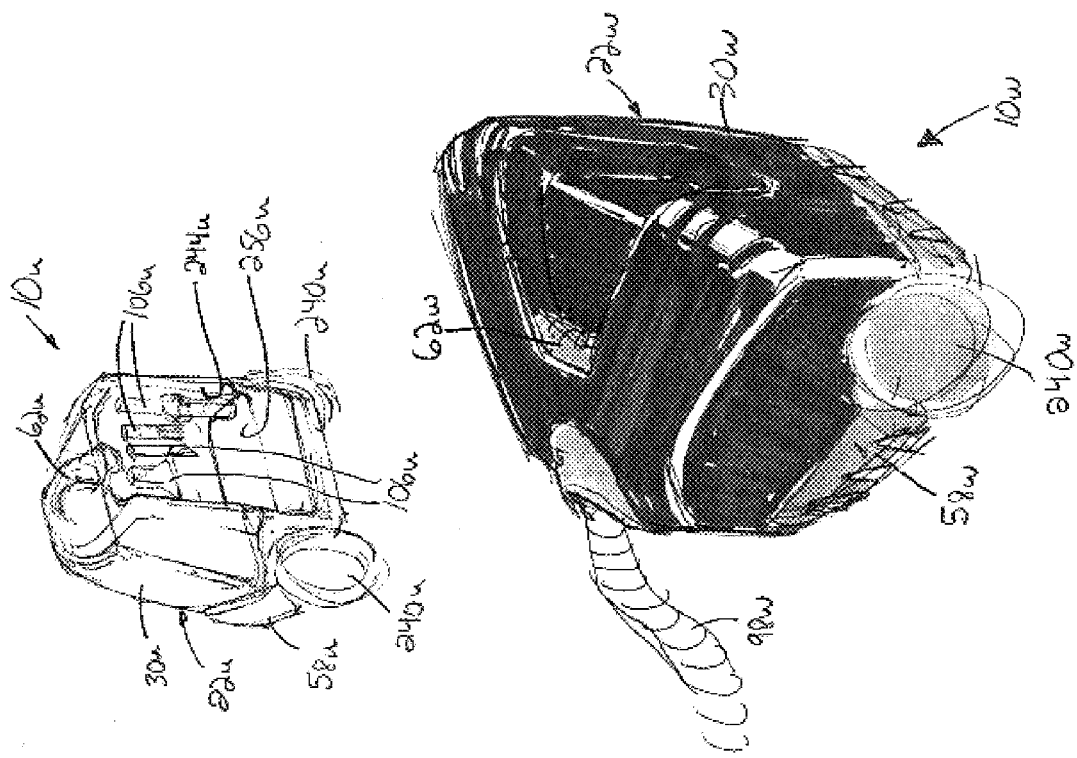
FIG. 26 is a plurality of perspective views of other constructions of a vacuum cleaner.
Figure 26:
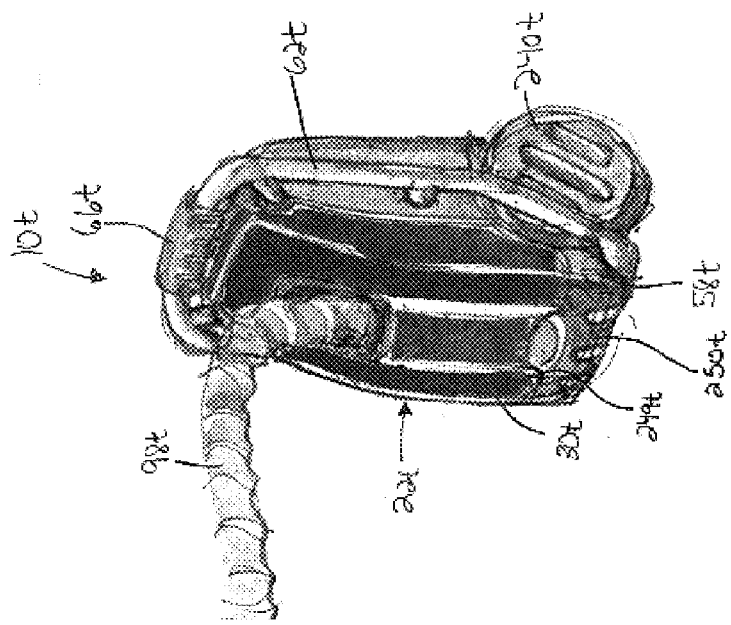

Alternative constructions of vacuum cleaners 10t, 10u and 10w are illustrated in FIG. 26. Reference is made to the above discussion regarding the structure, operation, and alternatives of the vacuum cleaner 10 illustrated in FIGS. 1-25. Common elements are identified by the same reference numbers "t", "u" and "w", respectively.

Figure 27:
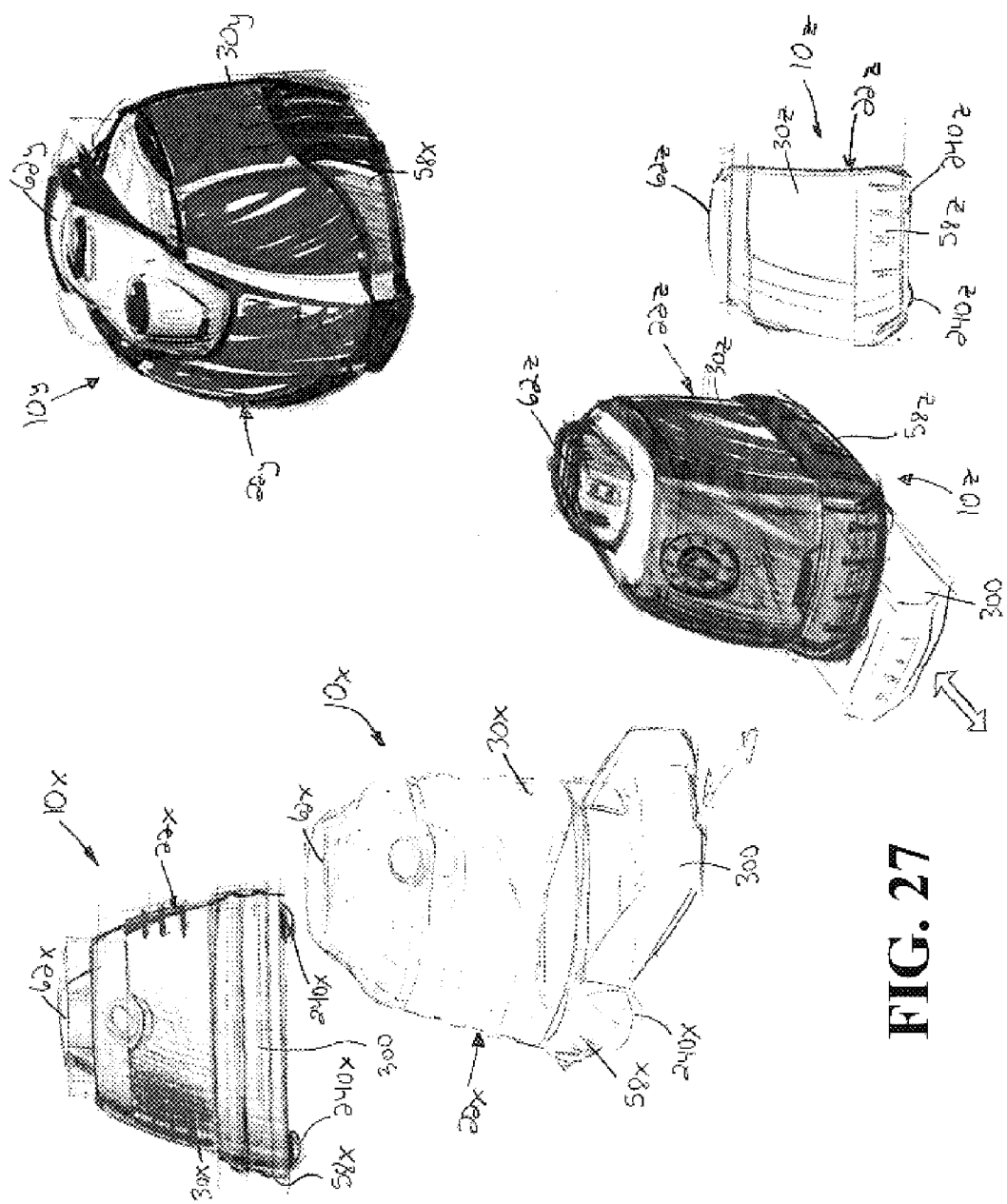
FIG. 27 is a plurality of perspective views of other constructions of a vacuum cleaner.

Alternative constructions of vacuum cleaners 10x, 10y and 10z are illustrated in FIG. 27. Reference is made to the above discussion regarding the structure, operation, and alternatives of the vacuum cleaner 10 illustrated in FIGS. 1-26. Common elements are identified by the same reference numbers "x", "y" and "z", respectively.

The vacuum cleaners 10x and 10z include a storage drawer 300 moveable between a retracted position and an extended position. Components, such as, for example the hose 98x and 98z, vacuuming accessories, a CD player, telephone, power tool batteries, and jobsite tools, can be stored in the drawer 300. In the illustrated construction, the drawer 300 is slideable between the retracted position and the extended position, however, the drawer 30 may be moveable between the retracted position and the extended position in a variety of other manners and still be within the spirit and scope of the present invention.

Figure 28:
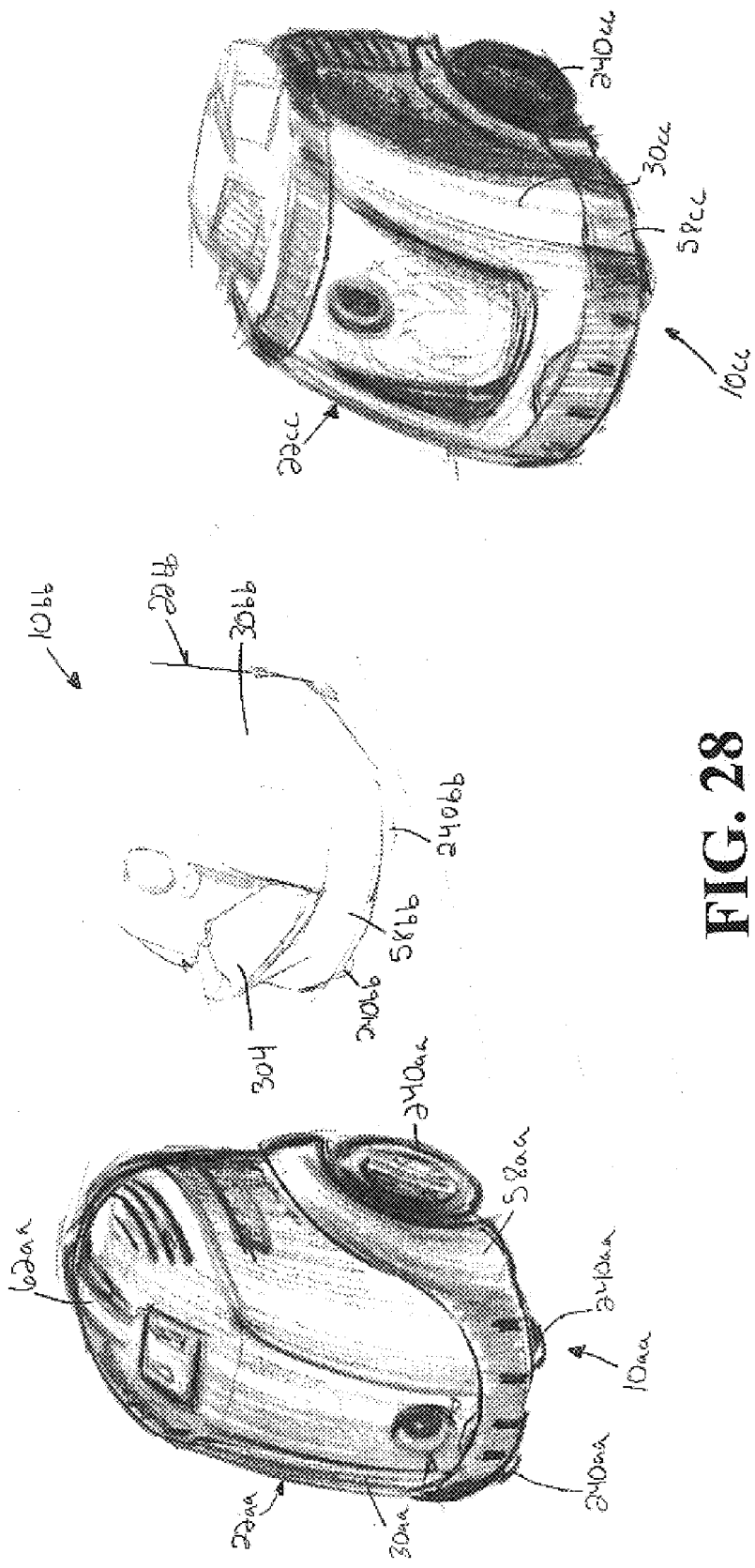
FIG. 28 is a plurality of perspective views of other constructions of a vacuum cleaner.

Alternative constructions of vacuum cleaners 10aa, 10bb and 10cc are illustrated in FIG. 28. Reference is made to the above discussion regarding the structure, operation, and alternatives of the vacuum cleaner 10 illustrated in FIGS. 1-27. Common elements are identified by the same reference numbers "aa", "bb" and "cc", respectively.

The vacuum cleaner 10bb includes a hose support 304 that rotates between a supporting position, in which the hose support 304 is rotated outwardly away from the housing 22bb in a position under the hose 98bb and the hose 98bb rests upon the support 304, and a stored position, in which the hose 98bb is disconnected from the housing 22bb and the hose support 304 is rotated inward toward the housing 22bb to a position where the hose support 304 is substantially flush with the exterior of the housing 22bb. In some constructions, the hose support 304 is moveable between the supporting position and the stored position in a manner other than rotation. In other constructions, the hose support 304 is selectively connectable and disconnectable from the housing 22bb.

Figure 29:
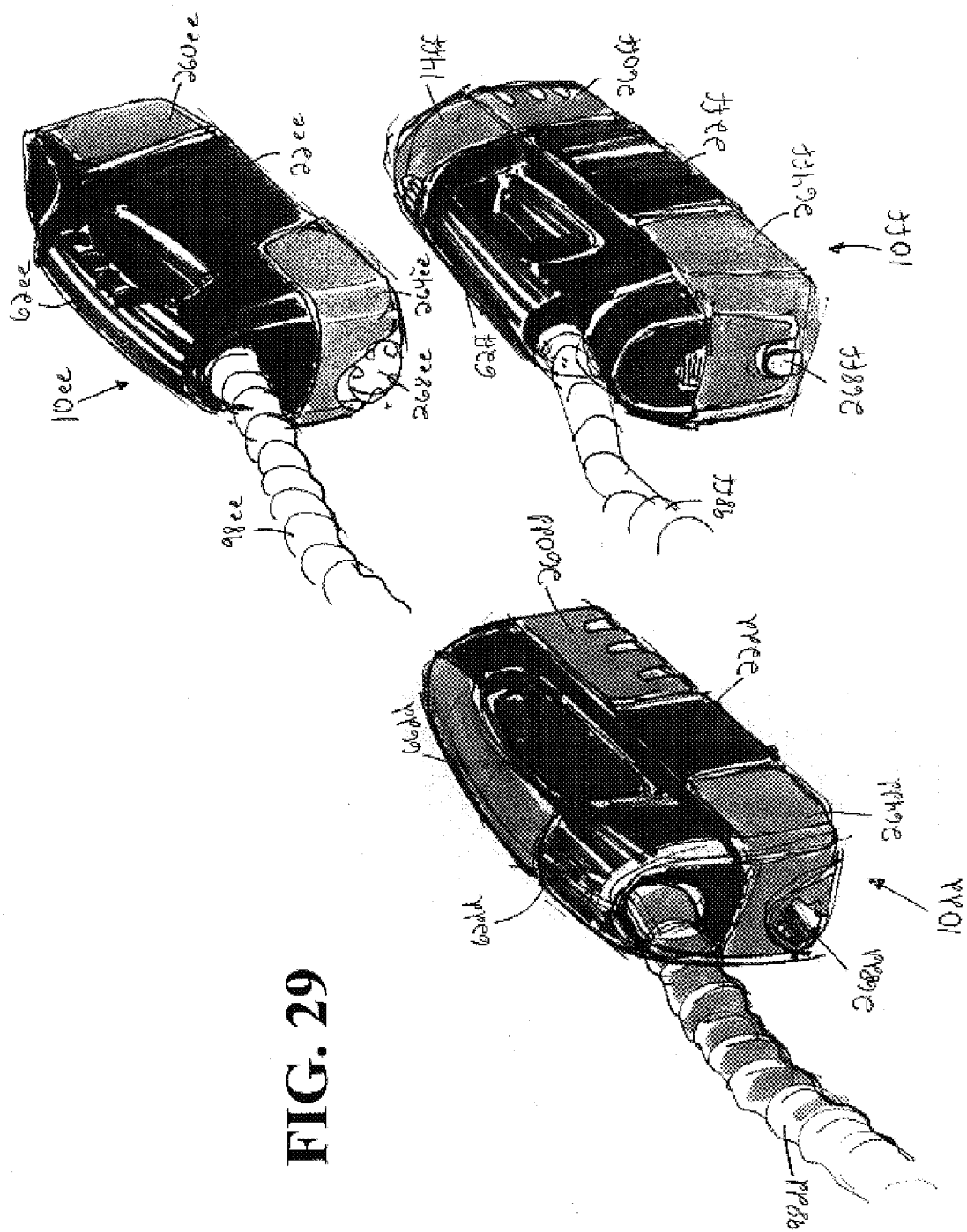
FIG. 29 is a plurality of perspective views of other constructions of a vacuum cleaner.
Figure 30:
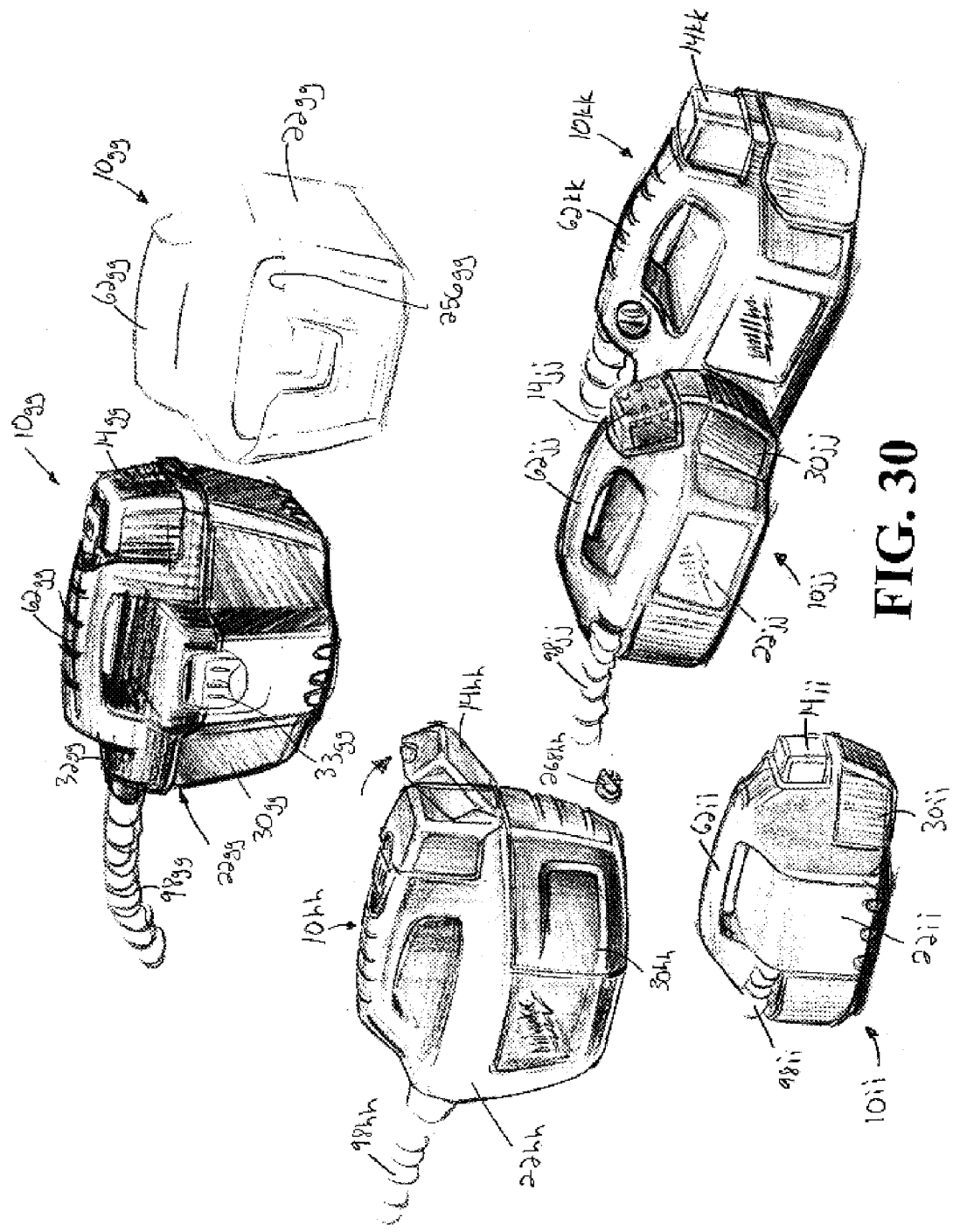
FIG. 30 is a plurality of perspective views of other constructions of a vacuum cleaner.
Figure 31:
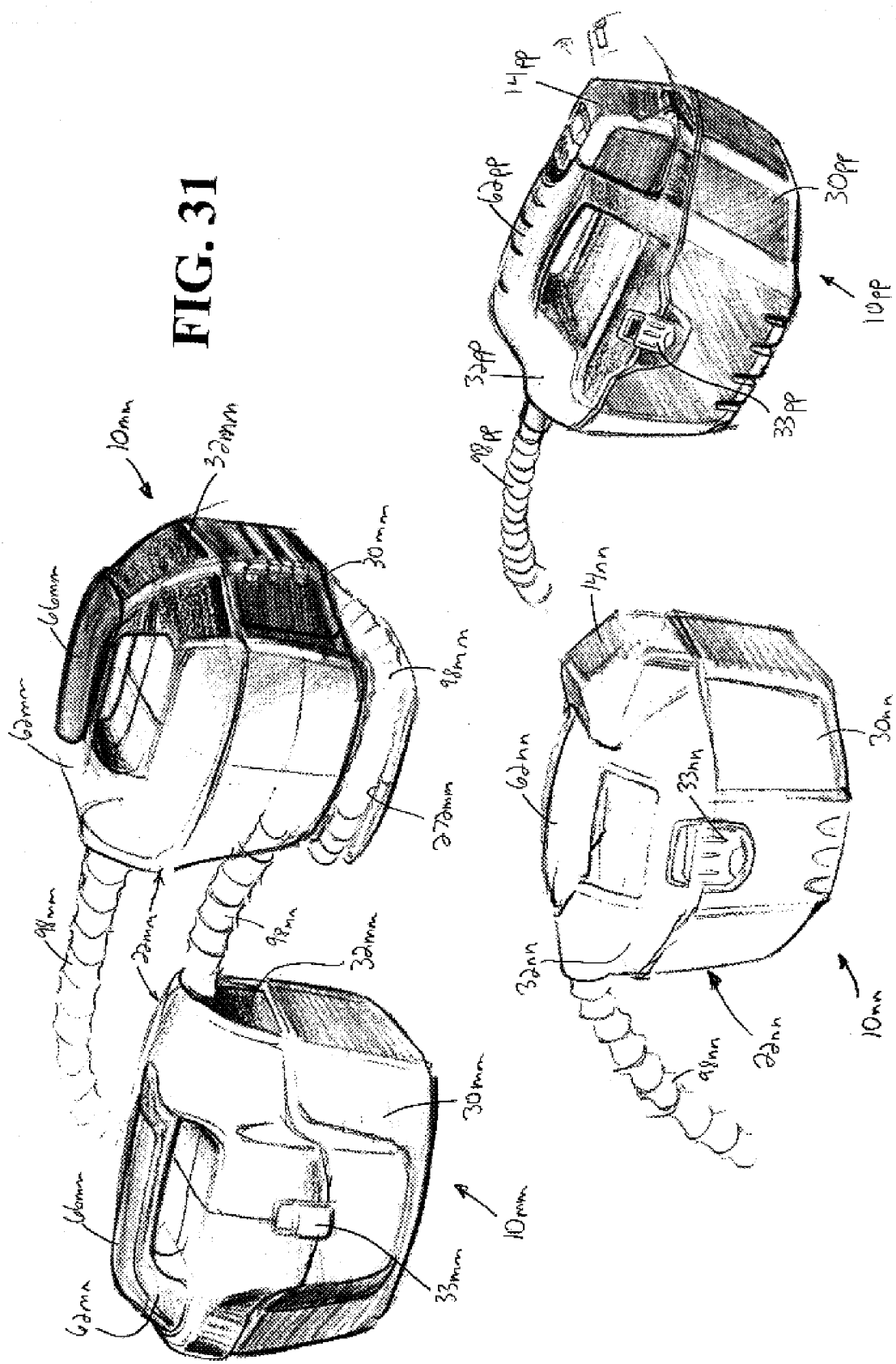
FIG. 31 is a plurality of perspective views of other constructions of a vacuum cleaner.

Alternative constructions of vacuum cleaners 10dd, 10ee, 10ff, 10gg, 10hh, 10ii, 10jj, 10mm, 10nn and 10pp are illustrated in FIGS. 29-31. Reference is made to the above discussion regarding the structure, operation, and alternatives of the vacuum cleaner 10 illustrated in FIGS. 1-28. Common elements are identified by the same reference numbers "dd", "ee", "ff", "gg", "hh", "ii", "jj", "mm", "nn" and "pp", respectively.

Figure 32:
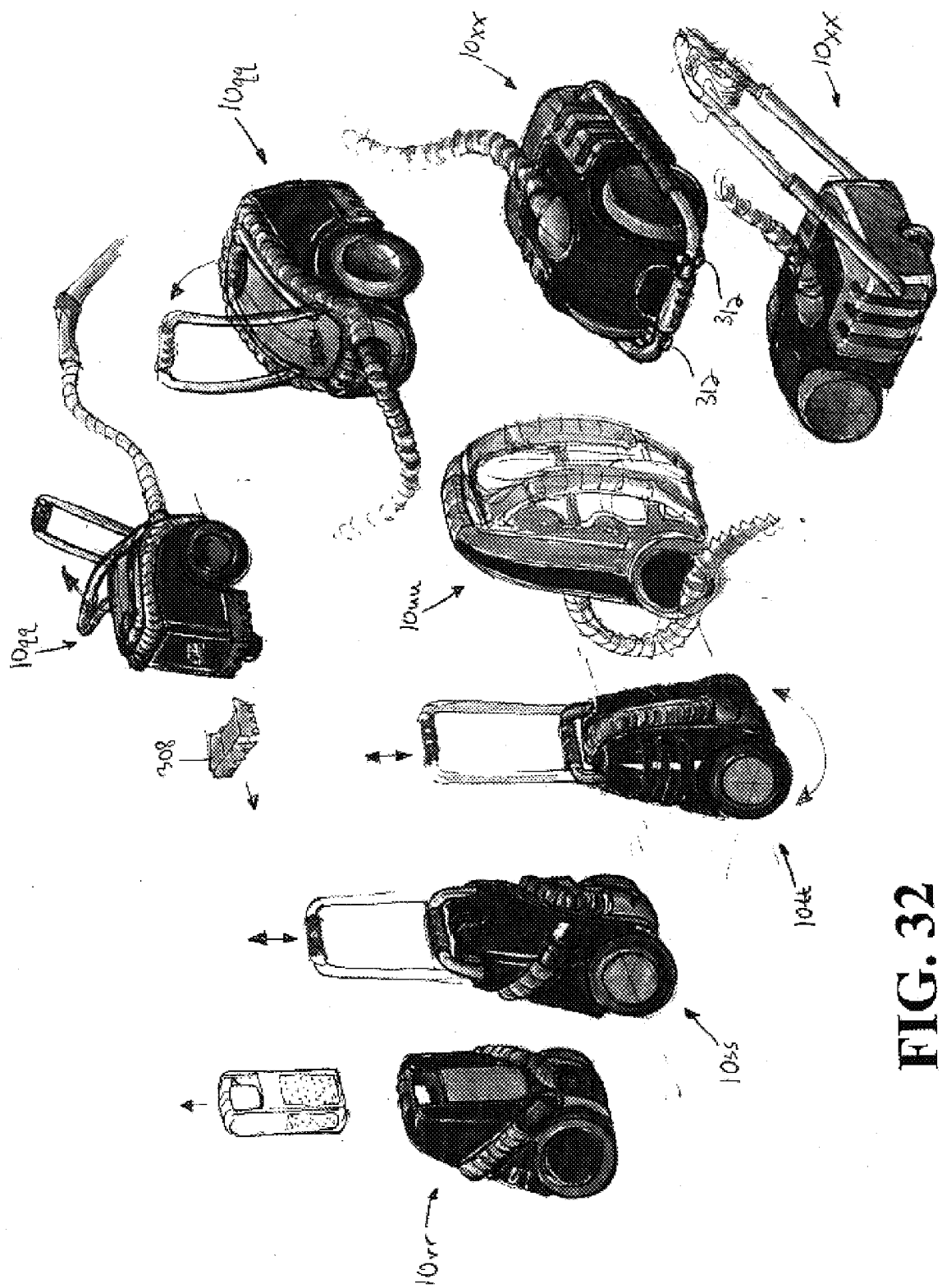
FIG. 32 is a plurality of perspective views of other constructions of a vacuum cleaner.

Alternative constructions of vacuum cleaners 10qq, 10rr, 10ss, 10tt, 10uu and 10xx are illustrated in FIG. 32. Reference is made to the above discussion regarding the structure, operation, and alternatives of the vacuum cleaner 10 illustrated in FIGS. 1-31. Common elements are identified by the same reference numbers "qq", "rr", "ss", "tt", "uu" and "xx", respectively.

The vacuum cleaner 10qq includes a storage drawer 308 that is removable from the housing 22qq. Alternatively, the vacuum cleaner 10qq can include a debris chamber 30qq removable from the housing 22qq. The debris is removed from the debris chamber 30qq and the debris chamber 30qq is replaceable back into the housing 22qq. The vacuum cleaner 10qq also includes a handle 62qq that is pivotable between a stored position, in which the handle 62qq is rotated downward toward and against the top of the housing 22qq, and an operating position, in which the handle 62qq is rotated away from the housing 22qq. When the handle 62qq is in the operating position, a user can grasp the handle 62qq and pull the vacuum cleaner 10qq to a desired location. Once the vacuum cleaner 10qq is in the desired location, the user can move the handle 62qq to the stored position.

The vacuum cleaner 10xx includes a handle 62xx moveable between a stored position, in which the handle 62xx is secured to the housing 22xx by a pair of snapfits 312, and an operating position, in which the handle 62xx is removed from the snapfits 312, rotated upwardly away from the housing 22xx and telescoped outwardly to increase the length of the handle 62xx.

Figure 33:
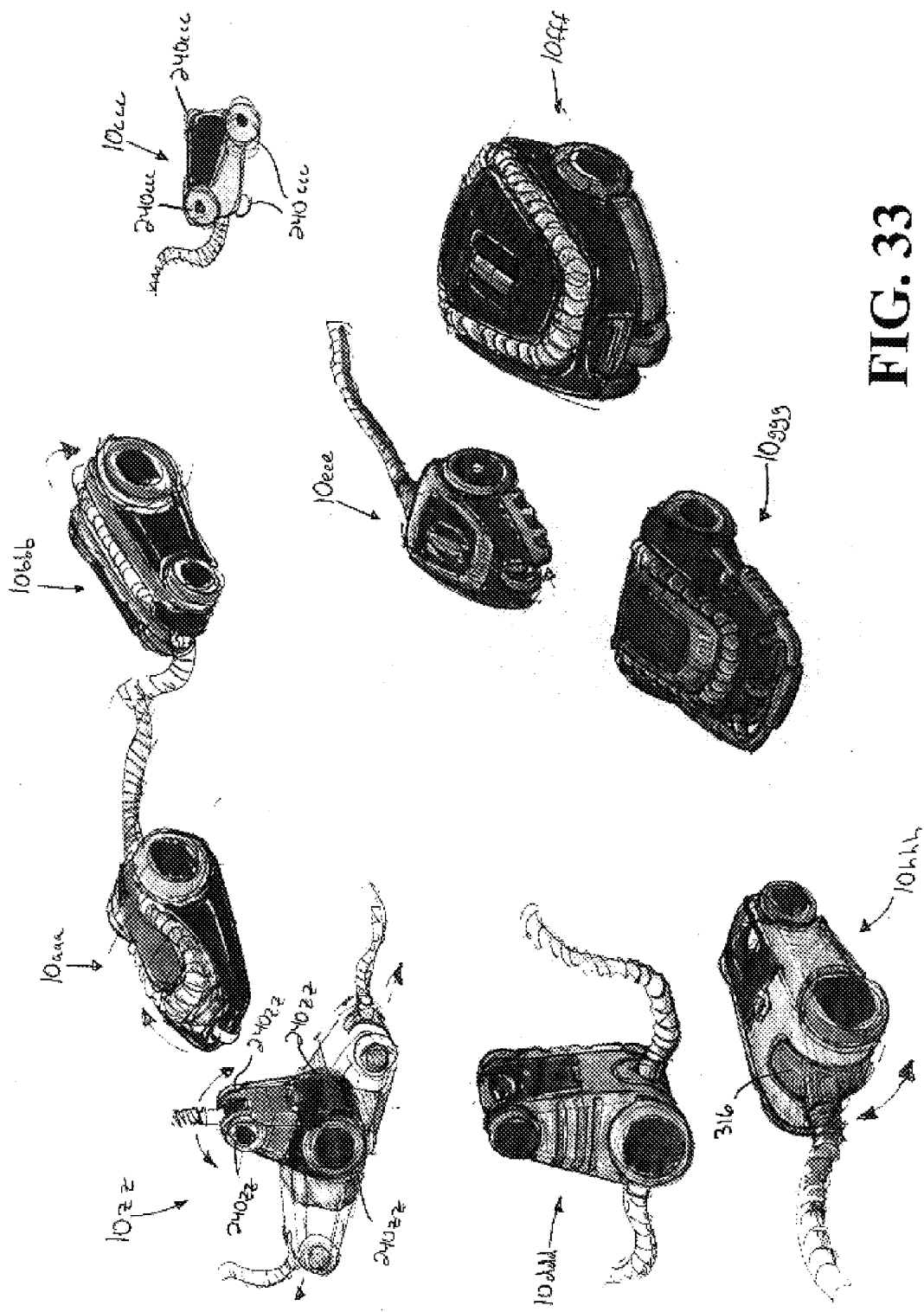
FIG. 33 is a plurality of perspective views of other constructions of a vacuum cleaner.

Alternative constructions of vacuum cleaners 10zz, 10aaa, 10bbb, 10ccc, 10ddd, 10eee, 10fff, 10ggg and 10hhh are illustrated in FIG. 33. Reference is made to the above discussion regarding the structure, operation, and alternatives of the vacuum cleaner 10 illustrated in FIGS. 1-32. Common elements are identified by the same reference numbers "zz", "aaa", "bbb", "ccc", "ddd", "eee", "ff" and "ggg", respectively.

The vacuum cleaner 10zz includes four rollers 240zz sufficiently sized to extend beyond the planes of the exterior of the housing 22zz in order to facilitate rolling of the vacuum cleaner 10zz in any orientation. The vacuum cleaner 10ccc has a different roller 240ccc configuration than vacuum cleaner 10zz to facilitate rolling of the vacuum cleaner 10ccc in any orientation.

Figure 34:
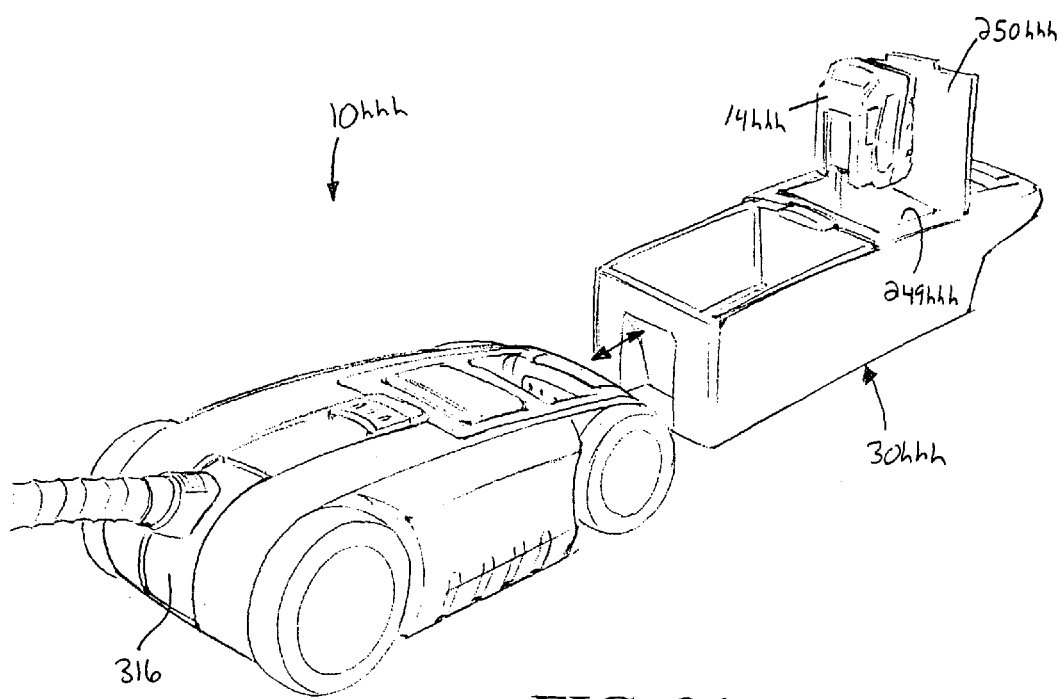
FIG. 34 is a perspective view of another construction of a vacuum cleaner

An alternative construction of a vacuum cleaner 10hhh is illustrated in FIG. 34. Reference is made to the above discussion regarding the structure, operation, and alternatives of the vacuum cleaner 10 illustrated in FIGS. 1-33. Common elements are identified by the same reference numbers "hhh".

The vacuum cleaner 10hhh includes a debris chamber 30hhh that is removable from the housing 22hhh. Once the debris chamber 30hhh is removed from the housing 22hhh, the cover 250hhh can be opened to remove and/or replace a battery 14hhh from and/or into the receptacle 249hhh. The debris chamber 30hhh is reconnected to the housing 22hhh after the cover 250hhh is closed and by sliding the debris chamber 30hhh into the housing 22hhh.

The vacuum cleaner 10hhh also includes a moveable hose connector 316 that is moveable relative to the remainder of the housing 22hhh. The moveable hose connector 316 moves with the hose 98hhh as the hose 98hhh changes elevations relative to the housing 22hhh. In the illustrated construction, the hose connector 316 pivots about a horizontal axis substantially parallel to the axis of the rollers 240hhh. In some constructions, the hose connector 316 pivots about a horizontal axis substantially perpendicular to the axis of the rollers 240hhh. In other constructions, the hose connector 316 is a ball type connector and allows movement in all directions.

Figure 35:
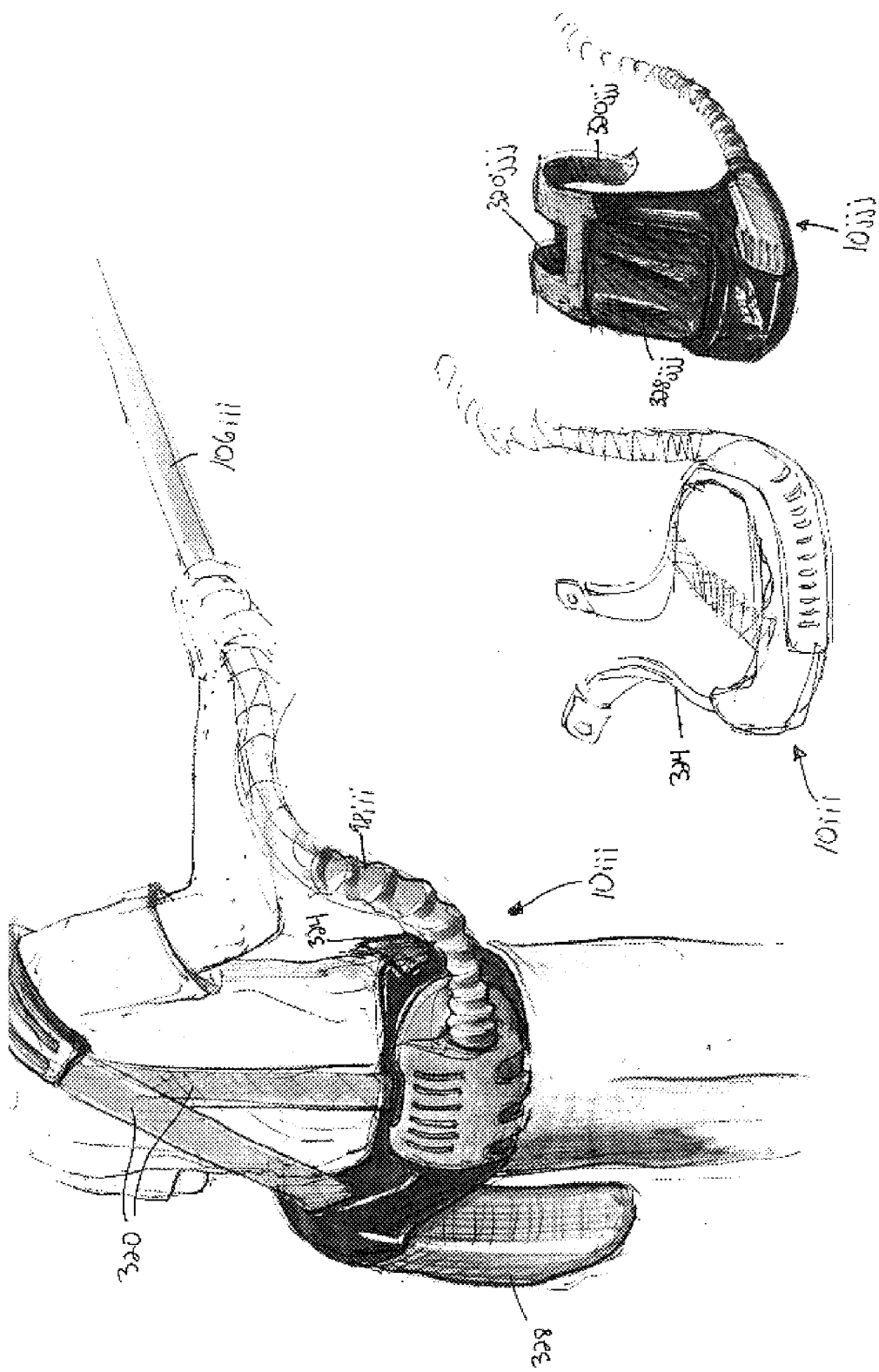
FIG. 35 is a plurality of perspective views of other constructions of a vacuum cleaner.

Alternative constructions of vacuum cleaners 10iii and 10jjj are illustrated in FIG. 35. Reference is made to the above discussion regarding the structure, operation, and alternatives of the vacuum cleaner 10 illustrated in FIGS. 1-34. Common elements are identified by the same reference numbers "iii" and "jjj", respectively.

The vacuum cleaner 10iii is attachable to the lower back of a user via a shoulder strap 320 and a waist belt 324. The majority of the vacuum weight is ergonomically positioned to make carrying of the vacuum cleaner 10iii as easy as possible. A removable external debris bag 328 is connected to the vacuum cleaner 10iii and is similar in function to a mulching bag or collecting bag for lawnmowers.

The vacuum cleaner 10jjj has a backpack type design and includes to shoulder straps 320jjj that are positionable over a user's shoulders. The debris bag 328jjj is positioned externally on the rear of the housing 22jjj.

It should be understood that the vacuum cleaners 10iii and 10jjj can have different configurations than that illustrated in FIG. 35 while still maintaining the general concept and idea of a waist or lower back supported vacuum and a backpack vacuum cleaner and still be within the spirit and scope of the present invention.

It should also be understood that all of the constructions of the vacuum cleaners disclosed herein have blowing capabilities as well as vacuuming capabilities and, therefore, are also blowers in addition to vacuum cleaners.

What is claimed is:

1. An electrical component comprising:
    a housing assembly defining a passageway;
    a motor supported by the housing assembly, the motor being selectively electrically connectable with a power source;
    a fan connected to the motor and operable to generate an airflow through the passageway;
    a blow-molded base connected to the housing assembly;
    a handle connected to at least one of the housing assembly and the base, the handle having an upper portion positioned above the housing assembly and a side portion positioned to one side of the housing assembly, the handle being configured to absorb impacts to the housing assembly;
    an electrical circuit supported by the housing, the electrical circuit being selectively electrically connectable with the power source;
    a first power-tool battery selectively electrically connectable with the electrical circuit such that power is selectively transferred between the first power-tool battery and the electrical circuit to selectively connect the first power-tool battery to the motor; and
    a controller selectively electrically connectable with the electrical circuit and the first power-tool battery, the controller being operable to electrically connect at least one of the first power tool battery and the power source to the electrical circuit.

2. The electrical component of claim 1, wherein the electrical circuit selectively electrically connects the motor and the power source.

3. The electrical component of claim 1, wherein the housing includes a support portion having a housing projection and a housing groove; and
    wherein, the battery includes a battery support portion having a battery projection and a battery groove, the battery projection being engageable with the housing groove, and the housing projection being engageable with the battery groove to connect the battery to the housing.

4. The electrical component of claim 1, wherein the electrical circuit selectively electrically connects the motor and the first power-tool battery.

5. The electrical component of claim 1, further comprising a charging circuit supported by the housing, wherein the charging circuit is selectively electrically connectable with the power source, and wherein the charging circuit is operable to selectively electrical connect the first power-tool battery and the power source to charge the first power-tool battery.

6. The electrical component of claim 1, wherein the housing also defines an opening, wherein the electrical component further comprises a container assembly having at least a first portion in fluid communication with the passageway, the container assembly having at least a second portion in fluid communication with the opening, wherein the fan is operable to generate an air flow through the passageway and into the first portion of the container assembly, and wherein, during operation of the fan generating the air flow, first debris is carried by the air flow through the passageway and into the first portion of the container assembly and second debris is insertable through the opening into the second portion of the container assembly without substantially effecting the air flow.

7. The electrical component of claim 1, further comprising a second power-tool battery selectively electrically connectable with the electrical circuit such that power is selectively transferred between the second power-tool battery and the electrical circuit to selectively connect the second power-tool battery to the motor.

8. The electrical component of claim 7, wherein the controller is operable to monitor a charge level of the first power tool battery and of the second power tool battery and selectively electrically connect one of the first power tool battery and the second power tool battery to the electrical circuit in response to the charge level of the first power tool battery and of the second power tool battery.

9. An electrical component comprising:
    a housing assembly defining a passageway;
    a motor supported by the housing assembly, the motor being selectively electrically connectable with a power source that is operable to deliver an AC current;
    a fan connected to the motor and operable to generate a vacuum;
    a handle connected to the housing assembly, the handle having an upper portion positioned above the housing assembly and a side portion positioned to one side of the housing assembly;
    a first power-tool battery selectively connectable to the housing assembly and operable to provide a DC current;
    an electrical circuit supported by the housing, the electrical circuit being selectively electrically connectable with the power source to selectively connect the power source to the motor and with the first power-tool battery to selectively connect the first power-tool battery to the motor; and
    a controller operable to electrically connect the power source to the motor and to connect the first power-tool battery to the electrical circuit for charging in response to a non-zero AC current and to electrically connect the first power-tool battery to the motor to provide the DC current to the motor in response to a zero AC current.

10. The electrical component of claim 9, further comprising a second power-tool battery selectively electrically connectable with the electrical circuit such that power is selectively transferred between the second power-tool battery and the electrical circuit to selectively provide power to the motor and charge the second power-tool battery.

* * * * *